US012729663B2

(12) United States Patent
Novek

(10) Patent No.: US 12,729,663 B2
(45) Date of Patent: Sep. 8, 2026

(54) POWER GENERATION FROM MOVING WATER

(71) Applicant: ParseHill Renewables, LLC, Houston, TX (US)

(72) Inventor: Ethan Joseph Novek, Houston, TX (US)

(73) Assignee: ParseHill Renewables, LLC, Houston, TX (US)

( * ) Notice: Subject to any disclaimer, the term of this patent is extended or adjusted under 35 U.S.C. 154(b) by 0 days.

(21) Appl. No.: 18/954,030

(22) Filed: Nov. 20, 2024

(65) Prior Publication Data

US 2025/0075677 A1 Mar. 6, 2025

Related U.S. Application Data

(63) Continuation-in-part of application No. 18/236,738, filed on Aug. 22, 2023, now abandoned, which is a continuation-in-part of application No. 18/217,204, filed on Jun. 30, 2023, now abandoned.

(60) Provisional application No. 63/446,558, filed on Feb. 17, 2023, provisional application No. 63/400,260, filed on Aug. 23, 2022, provisional application No. 63/652,753, filed on May 29, 2024.

(51) Int. Cl.
*F03B 13/10* (2006.01)
*F03B 13/06* (2006.01)

(52) U.S. Cl.
CPC .............. *F03B 13/10* (2013.01); *F03B 13/06* (2013.01); *F05B 2240/95* (2013.01); *F05B 2240/97* (2013.01); *F05B 2260/422* (2020.08)

(58) Field of Classification Search
CPC .......... F03B 13/06; F03B 13/08; F03B 13/10; F03B 13/12
USPC ........................... 60/398; 290/43, 54; 405/75
See application file for complete search history.

(56) References Cited

U.S. PATENT DOCUMENTS

| | | | | | |
|---|---|---|---|---|---|
| 4,054,399 | A * | 10/1977 | Maurer | F04F 7/02 | 251/65 |
| 8,973,608 | B2 * | 3/2015 | Selwyn | F04F 7/02 | 417/225 |
| 9,163,606 | B2 * | 10/2015 | Azar | F03B 17/02 | |
| 10,823,133 | B2 * | 11/2020 | Dien | F03B 13/264 | |
| 12,092,069 | B2 * | 9/2024 | Anteau | F03B 13/08 | |
| 12,152,559 | B2 * | 11/2024 | Navarro | F03B 15/04 | |
| 2009/0152871 | A1 * | 6/2009 | Ching | F03G 7/00 | 415/916 |

(Continued)

OTHER PUBLICATIONS

"Corporate VPPAs: Risks and Sensitivities," Web page <https:www.projectfinance.law/publications/2020/june/corporate-vppas-risks-and-sensitivities/>, Jun. 16, 2020.

(Continued)

*Primary Examiner* — Michael Leslie
(74) *Attorney, Agent, or Firm* — HUNTON ANDREWS KURTH LLP

(57) ABSTRACT

The application pertains to a process for subsea power generation and fluid utilization from open water currents. In one embodiment the process comprises channeling water from a subsea current through a pipe system constructed to withstand subsea pressures; creating a water hammered pressurized fluid within the pipe system; directing the water hammered pressurized fluid through a delivery valve; and using the water hammered pressurized fluid.

24 Claims, 3 Drawing Sheets

(56) References Cited

U.S. PATENT DOCUMENTS

| | | | | |
|---|---|---|---|---|
| 2012/0117003 | A1 | 5/2012 | Benaron | |
| 2022/0327538 | A1 | 10/2022 | Kumar | |
| 2024/0141859 | A1 * | 5/2024 | Gilbert | F03B 13/105 |

OTHER PUBLICATIONS

"Virtual Power Purchase Agreement, Introduction to the Virtual Power Purchase Agreement," Web page <https://rmi.org/insight/virtual-power-purchase-agreement/>, Jun. 21, 2019.

"5 Things Sustainability Leaders Should Know About VPPAs," Web page <https://sustainablesolutions.duke-energy.com/resources/5-things-sustainability-leaders-should-know-about-vppas/>, Dec. 2, 2020.

"M-RETS Renewable Thermal Tracking," Web page <https://www.mrets.org/m-rets-renewable-thermal-tracking-system/>, Aug. 14, 2020.

* cited by examiner

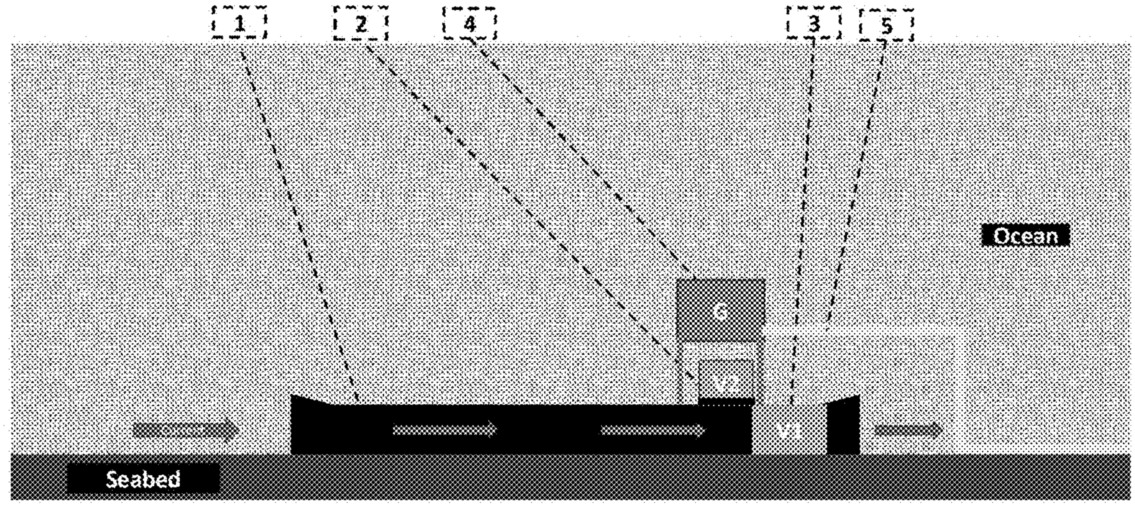
FIG. 1 (ABOVE)
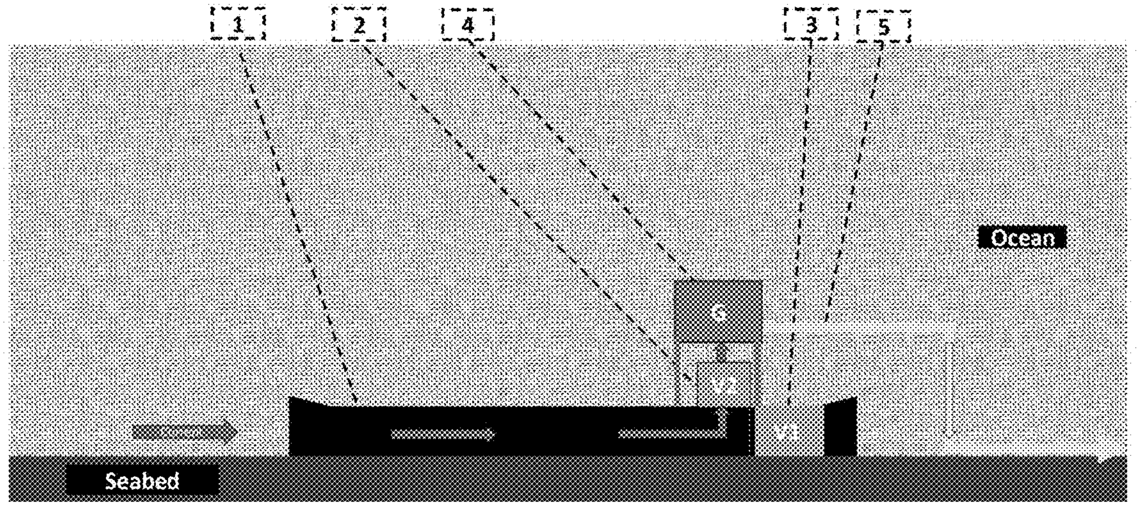
FIG. 2 (ABOVE)

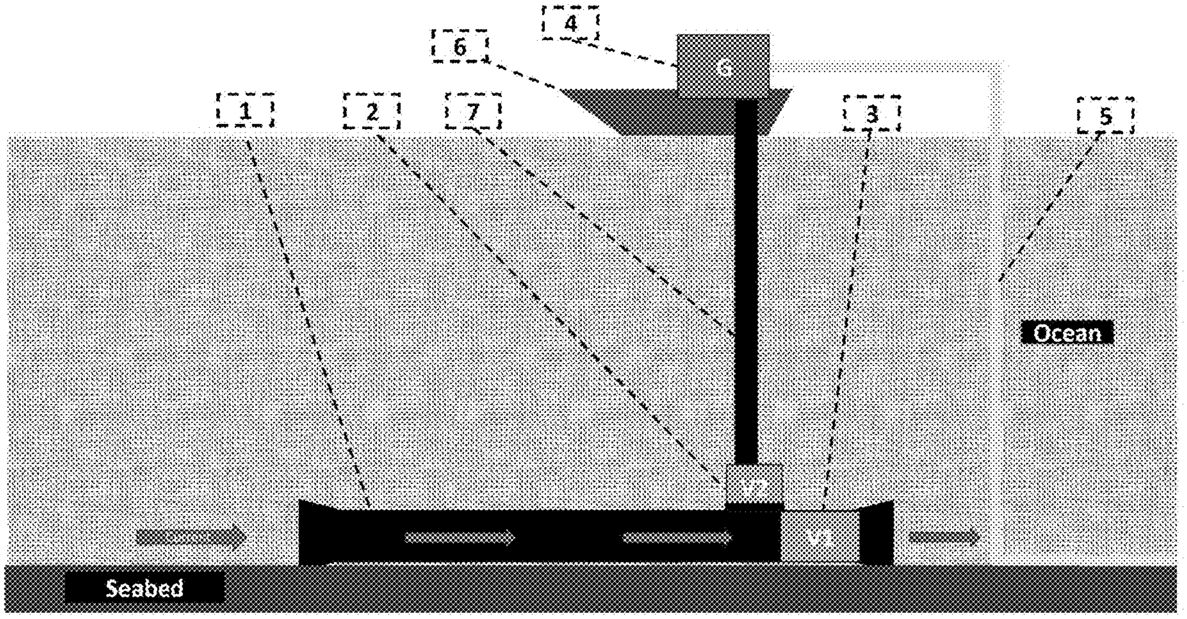
FIG. 3 (ABOVE)
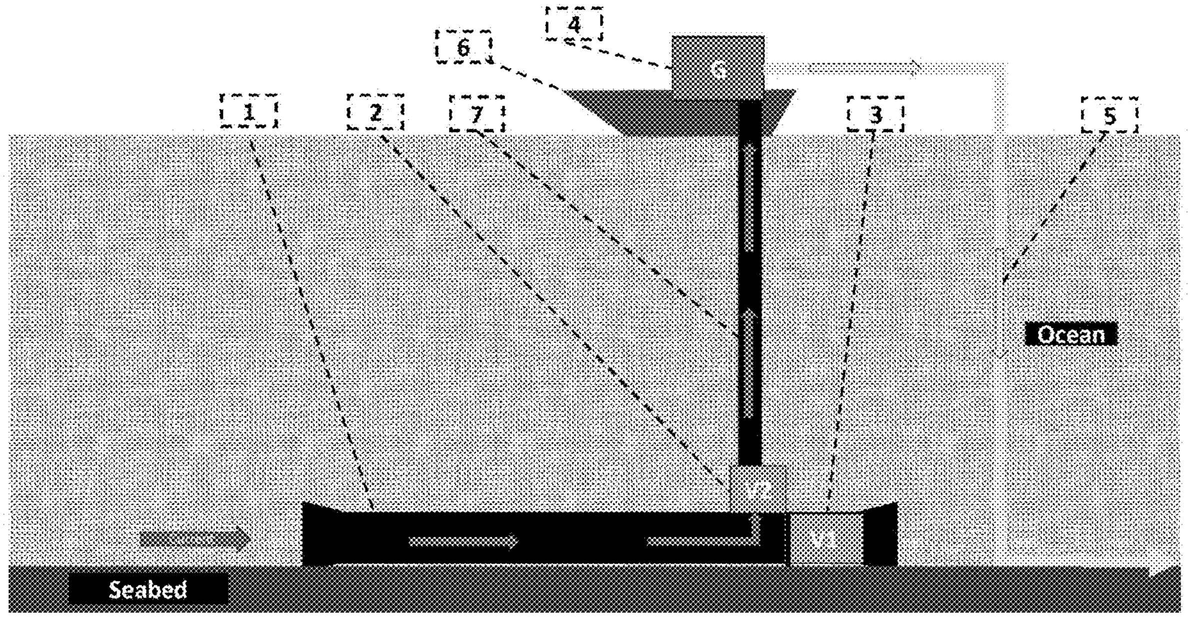
FIG. 4 (ABOVE)

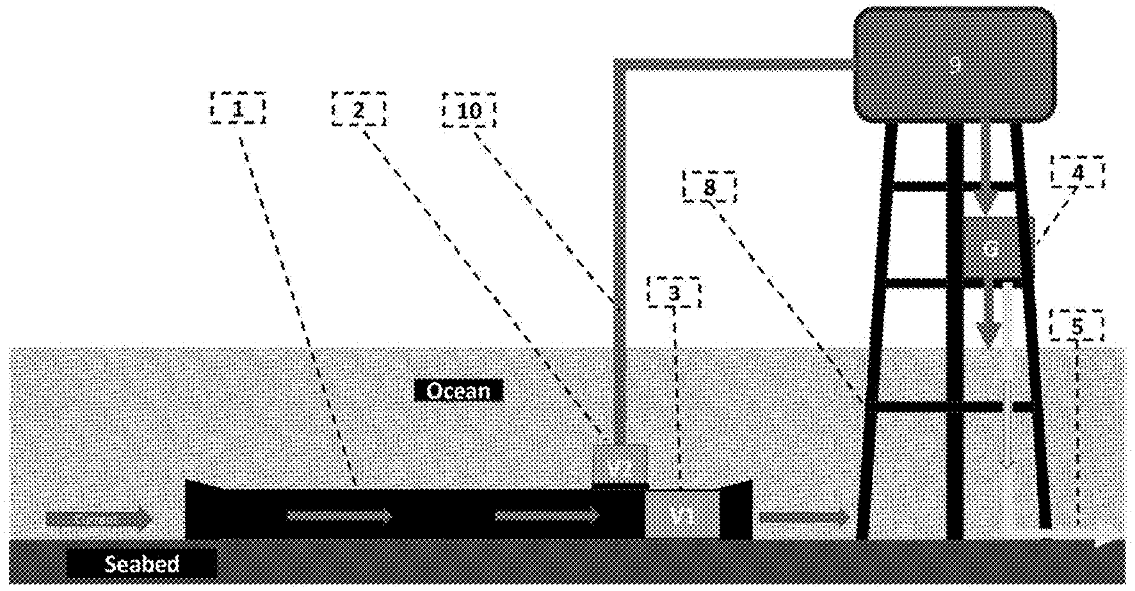
FIG. 5 (ABOVE)
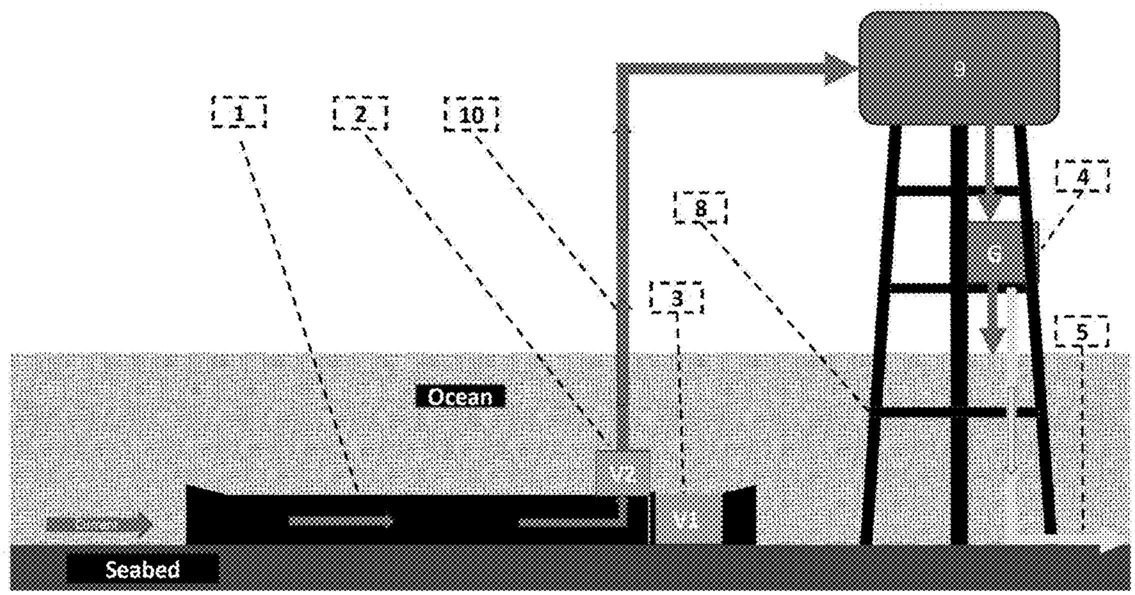
FIG. 6 (ABOVE).

POWER GENERATION FROM MOVING WATER

CROSS-REFERENCE TO RELATED APPLICATIONS

The present application is a continuation-in-part (CIP) and claims priority from pending U.S. application Ser. No. 18/236,738 filed Aug. 22, 2023 entitled "SYSTEMS AND METHODS TO FACILITATE INCREASED BUILDING OF CARBON REMOVAL AND CARBON CAPTURE INFRASTRUCTURES" which application is a continuation-in-part (CIP) and claims priority from pending U.S. application Ser. No. 18/217,204 entitled "SYSTEMS AND METHODS TO FACILITATE INCREASED BUILDING OF RENEWABLE ENERGY INFRASTRUCTURES" filed on Jun. 30, 2024 which application claims priority to provisional application 63/446,558 filed on Feb. 17, 2023 and provisional application 63/400,260 filed Aug. 23, 2023, and provisional application 63/652,753 filed May 24, 2024, all of which applications are incorporated herein by reference.

This application is also related to U.S. Pat. Nos. 10,514,021; 10,562,511; 10,737,677; 10,961,975; 11,286,898; 11,614,066; 11,655,793; 11,845,678; 11,970,410; 11,981,586; and 12,043,556 all of which patents are incorporated herein by reference.

BACKGROUND AND SUMMARY

Open water, or tidal current, or stream power, or other moving water power generation systems, such as tidal stream turbines, are expensive and difficult to maintain due to the need to capture power from large volumetric flow rate, low flow velocity moving water, which in may requires large rotating water turbines. Large volumetric flow rates and limited flow velocities may necessitate large rotating power-generating equipment, which may result in complexity, difficult installation, cost, reliability challenges, costly and difficult maintenance requirements, and challenges related to biofouling, corrosion, marine life harm from rotating blades, large floating or subsea objects, and the abrasive effects of sediment-laden flows.

In some embodiments, the present invention may address these challenges by, for example, concentrating or transforming the energy or power from large, open water flows into smaller flows, more manageable flows. In some embodiments, the present invention may enable the use of smaller or more compact power generation equipment for the same or similar power generation capacity, which may greatly improve capacity cost and maintainability. In some embodiments, the present invention may enable the relocation of power-generating or fluid processing systems to more accessible locations, such as floating platforms, land-based facilities, or subsea power houses, or elevated towers, while providing the same or similar power generation capacity, enabling lower cost, more accessible, lower maintenance, more marine life friendly, mechanically simpler, easier to maintain and monitor, and more compact power generation.

In some embodiments, the present invention may comprise a subsea hydraulic ram pump system capable of harnessing energy from large volumetric flows in open underwater environments. Specifically, some embodiments may comprise a mechanism for transferring and concentrating a portion of the kinetic and potential energy of currents or open water flows into a smaller volumetric higher density flows, enabling the downsizing, relocation, and enhanced manageability of power-generating or fluid-processing components such as hydroelectric generators, or desalination systems, or pressure exchangers, or turbochargers, or fluid transfer processes, or fluid injection systems, or fluid displacement systems, or energy storage systems, or pressure storage systems.

BRIEF DESCRIPTION OF DRAWINGS

FIG. 1: Subsea power generation process with integrated compact subsea turbine generator fluidly connected to the high pressure output stream.

FIG. 2: Subsea power generation process with integrated compact subsea turbine generator fluidly connected to the high pressure output stream.

FIG. 3: Subsea flow velocity pressure conversion, hydraulic pressure amplification, and power transfer process.

FIG. 4: Subsea flow velocity pressure conversion, hydraulic pressure amplification, and power transfer process generating power by transferring high pressure to power generating system on a floating vessel.

FIG. 5: Subsea flow velocity pressure conversion, hydraulic pressure amplification, and power transfer process storing power by transferring fluid to a higher elevation reservoir.

FIG. 6: Subsea flow velocity pressure conversion, hydraulic pressure amplification, and power transfer process storing power by transferring fluid to a higher elevation reservoir and generating power by transferring the fluid to a hydropower turbine or generator.

EXAMPLE DEFINITIONS

Hydraulic Ram Pump: A mechanical device that utilizes the kinetic energy of a relatively larger volume flowing fluid, such as water, to produce a relatively higher-pressure, smaller-volume fluid output.

Subsea Environment: Any underwater domain, including oceans, rivers, estuaries, lakes, artificial reservoirs, or other water bodies, where the system may be deployed or may operate. A subsea environment may include natural and man-made aquatic environments.

Downstream Applications: Applications or processes that utilize the energy or pressurized fluid generated by the system. Examples may include, but are not limited to, one or more or any combination of the following: power generation, or desalination, or fluid transfer, or industrial fluid transfer, or energy storage, or injection processes, or environmental fluid management, or pressure exchange, or power exchange, or fluid displacement, or subsea processing, or subsea application, or offshore application, or applications or uses described herein, or applications or uses of a pressurized fluid in the art.

High-Pressure Output: A pressurized fluid stream generated by the system. In some embodiments, the High-Pressure Output may comprise the fluid generated, or produced, or delivered by the Second Valve, or the Delivery Valve, or High Pressure Output Valve or port, or any combination thereof.

Drive Pipe: A conduit through which water or another fluid is channeled into the system. In some embodiments, the drive pipe may comprise a pump chamber, or the drive pipe and/or pump chamber may be used interchangeably.

Pump Chamber: A component of a hydraulic ram pump system wherein the water hammer effect may occur and/or a component which may facilitate the transformation of kinetic energy into a high-pressure output. The pump chamber may include the drive pipe, or flow concentrators, or flow diffusers, or connection points, or any combination thereof. In some embodiments, the pump chamber and the drive pipe may be used interchangeably.

Waste Valve: A valve which may regulate waste flow. A valve which may help generate the water hammer effect by opening and closing, potentially cyclically, to regulate fluid flow.

Waste Flow: In some embodiments, the system or process may cycle between a state of 'waste flow' and a state of 'delivery flow,' for example, wherein water flow through the drive pipe or pump chamber and exiting through the first valve or waste valve into, for example, the moving body of water or the body of water may comprise the 'waste flow' and/or the 'delivery flow' may comprise water or fluid exiting or passing through the second valve or high pressure output valve, or the high pressure output fluid generated by the unit. In some embodiments, both waste flow and delivery flow may be beneficial and/or an amount of waste flow may be beneficial to forming an amount of delivery flow. For example, in some embodiments, water may need to be flowing through the drive pipe or pump chamber for sufficient water hammer effect to occur when a valve, such as the first valve, closes, wherein the water hammer effect may drive the formation of the delivery flow, such as the high pressure output water. In some embodiments, a ratio between the volume of 'waste flow' to the volume of 'delivery flow' may be optimized.

Delivery Valve: A valve that directs pressurized fluid from the pump chamber to downstream applications. In some embodiments, it may be desirable for the delivery valve to prevent backflow or loss of pressure. In some embodiments, the Delivery Valve may be referred to as the 'Second Valve', or High Pressure Output Valve or Port, or any combination thereof.

Modular Components: Parts or units of the system which may be designed to facilitate scalability, or adaptability, or easier replacement, or easier installation, or easier modification, or easier adjustment, or any combination thereof. Modular components may include, but are not limited to, drive pipes, or pump chambers, or valves, or flow concentrator, or flow diffuser, or pipes, or conduits, or sensors, or any combination thereof.

Flow Concentrator: A device or structure that may channel and/or accelerate incoming water or fluid flow and/or may enhance fluid velocity and/or may enable greater pressure amplification and/or may enable higher pressure fluid output from the delivery valve. Some of the characteristics of the flow diffuser may overlap with or may be interchangeable with the flow concentrator.

Flow Diffuser: A device or structure that may at least partially manage and/or regulate the discharge characteristics of the waste fluid or fluid exiting the system. In some embodiments, the Flow Diffuser may reduce environmental impact and/or improve efficiency and/or improve fluid flow and/or enable smooth integration with downstream components. Some of the characteristics of the flow diffuser may overlap with or may be interchangeable with the flow concentrator.

Sequential Configuration: An arrangement of multiple units which may be connected in a series to, for example, sequentially increase the pressure or energy density of the output stream. In some embodiments, a sequential configuration may also be referred to as stacking or stacked.

Parallel Configuration: An arrangement of multiple units operating simultaneously. For example, a Parallel Configuration may enable the handling of larger volumetric flows, or may provide redundancy and/or capacity expansion.

Anti-Fouling Features: Coatings, materials, or mechanisms which may be designed to resist the accumulation of biological organisms or sediment on system components.

Subsea Anchoring System: A foundation or support mechanism which may be employed to at least partially secure the system to the seabed or other underwater structures. Examples include, but are not limited to, gravity-based anchors, or suction piles, or pile-driven supports, or any combination thereof.

Operational Environment: The physical and technical conditions under which the system operates. This may include, but are not limited to, flow velocities, or sediment content, or salinity, or depth, or other environmental factors, or any combination thereof.

Monitoring and Control Systems: Integrated technologies, such as sensors and data acquisition systems, which may be used to, for example, measure operational parameters, or optimize system performance, or facilitate operations or maintenance, or any combination thereof.

DETAILED DESCRIPTION

The present invention may pertain to systems and methods for generating power from moving water or bodies of water. In some embodiments, the present invention may pertain to ultra-low cost, or low maintenance, or minimal moving parts, or economically viable, or elegant, or any combination thereof systems and methods for generating power from moving water. Some embodiments may generate power from moving water or a moving body of water, which may include, but are not limited to, one or more or any combination of the following: ocean, or tidal current, or tidal stream, or ocean stream, or ocean current, or estuary, or river, or stream, or hydropower flow, or moving water, or bay, or lake, or subterranean flow, or aquifer, or spring.

Some embodiments may pertain to systems and/or methods capable of harnessing energy from large volumetric flows in open underwater environments. Some embodiments may involve transferring and concentrating at least a portion of the kinetic and potential energy from large volumetric flows into smaller volumetric flow, which may enable the downsizing, or lower cost, or relocation, or enhanced manageability, or any combination of power-generating and/or fluid-processing components, which may include, but are not limited to, one or more or any combination of the following: hydroelectric generators, or turbines, or turbochargers, or desalination systems, or pressure exchangers, or PX pressure exchangers, or membrane based process, or energy storage systems, or pressure storage systems, or injection systems, or injection wells, or fluid transfer, or fluid power systems. In some embodiments, said transferring or concentrating may involve systems or methods or mechanisms which may require minimal moving parts, or may be passive, or may be inexpensive, or may be simple, or may be reliable, or any combination thereof.

For example, some embodiments may comprise underwater or subsurface or subsea hydraulic ram pump systems and/or methods, which may transform or transfer the energy or power of a proportionally high-volumetry flow rate water flow into a proportionally concentrated, high-pressure, proportionally low-volumetry flow rate fluid. For example, some embodiments may comprise subsea hydraulic ram pump systems and/or methods, which may transform or transfer the energy or power of a proportionally high-volume water flow into a proportionally concentrated, high-pressure, proportionally low-volume flow. For example, some embodiments may comprise underwater or subsurface or subsea fluid ejector or aspirator systems and/or methods, which may transform or transfer the energy or power of a proportionally high-volume water flow into a proportionally concentrated, high-pressure, proportionally low-volume flow fluid.

Some embodiments may comprise to a subsea hydraulic ram pump system designed to transform energy or power from large volumetric water flows, such as in open underwater environments, into a high-pressure, low-volume output, which may be suitable for downstream applications. Some embodiments may at least partially capture and convert at least a portion of kinetic energy into a concentrated energy output, which may include but is not limited to, one or more or any combination of the following: hydroelectric power generation, desalination, pressure exchange, and other fluid or energy processing systems. In some embodiments, the subsea components may comprise a hydraulic ram pump setup, which may receive a low pressure high volumetry flow rate water from a current or other moving water, while the high pressure proportionally lower volumetric flow rate output, which may be described as the high pressure output, may be transferred to or fluidly connected to power-generating or fluid-processing components which may comprise proportionally smaller or more compact size and/or may be located in more accessible environments, such as floating platforms, land-based installations, or elevated towers. Some embodiments may facilitate maintainability and accessibility, and/or may result in lower complexity and capital cost.

Some embodiments may comprise a subsea system comprising flow conduit or channel, which may comprise a pipe, or drive pipe, or pump chamber, terms which may be used interchangeably; a fluidly connected flow conduit or channel opening and closing mechanism, such as a first valve; a fluidly connected higher pressure output fluid opening and closing mechanism, such as a second valve; and a passive and/or active mechanism for opening, closing, and/or monitoring said first and/or second valves. In some embodiments, the second valve may be fluidly connected to a fluid transport mechanism, such as a second pipe, which may fluidly connect the high pressure output, which may comprise higher pressure water or other fluid, from the drive pipe to downstream uses or applications, which may include, but are not limited to, one or more or any combination of the following: power generation, or hydroelectric power generation, or pressure exchange, or pressure exchanger, or PX pressure exchanger, or turbocharger pressure exchanger, or other pressure exchanger, or fluid displacement system, or energy storage system, or pressure storage system, or flow smoother, or pressure compensator, or desalination, or reverse osmosis system, or membrane based process desalination, or vacuum, or injection, or fluid processing, or transfer to a higher elevation, or transfer to a reservoir, or pipeline flow, or a downstream use, or a downstream use described herein, or a use of pressurized or moving fluid in the art. In some embodiments, a flow concentrator, which may include, but is not limited to, a funnel, or a tapered structure, or an angled structure, or any combination thereof, may be employed to, for example, facilitate or direct water flow into the drive pipe and/or enable or enhance the flow velocity, or the velocity pressure, or power density, or any combination thereof of the water flow into the drive pipe. In some embodiments, a grate or other mechanism may be employed to, for example, prevent or reduce potential debris or objects from entering the drive pipe. In some embodiments, a diffuser, which may include, but is not limited to, a funnel, or a tapered structure, or an angled structure, or any combination thereof, may be employed to, for example, allow water to exit the drive pipe or system, such as water exiting through the first valve which may be referred to as the waste valve, in a manner which may facilitate flow through the drive pipe, or improve energy efficiency, or allow the water exit at a lower flow velocity than the flow velocity in the drive pipe, or allow the water to enter the water body at a flow velocity consistent with or similar to the flow velocity of the current or stream or moving water, or any combination thereof. Some embodiments may be constructed using materials which may enable structural rigidity and design shape to enable or facilitate the water hammer effect or pressure wave formation, which may enable power generation, or higher pressure amplification, or higher pressure output, or resilience, or longevity, or any combination thereof. For example, in some embodiments, the materials of construction may comprise including, but are not limited to, one or more or any combination of the following: steel, or marine grade steel, or rigid plastic, or HDPE, or polypropylene, or polyethylene, or PVC, or polycarbonate, or PTFE, or acrylate, or composite, or concrete, or composite, or fiberglass, or carbon fiber, or fiber, or nylon, or ABS, or epoxy, or PET, or metal, or aluminum, or alloy, or titanium, or corrosion resistant material. In some embodiments, it may be desirable to ensure the materials exposed to the water may be resistant to corrosion and/or biofouling, and/or coatings, or surface modifications, or other approaches, or any combination thereof may be employed. In some embodiments, fluidly connected to the output port or high pressure output or second valve may be a pressure stabilizing or flow stabilizing or flow smoothing mechanism, which may include, but is not limited to, one or more or any combination of the following: a pressure tank, or fluid displacement storage, or pressure storage, or air tank, or cavity, or bellows, or diaphragm, or bladder tank, or an energy storage system, or a reservoir, or a water tank, or a higher elevation structure, or a gravity storage tank, or turbine, or a power generation mechanism, or a pressure exchanger, or a pressure transfer device, or a power conversion mechanism, or any combination thereof.

A major advantage of some embodiments may be that marine life or objects may flow through the drive pipe unharmed or with lower risk of harm due to the nature of the drive pipe as a flow channel and/or the potential avoidance of the use of high speed rotating turbine blades within the drive pipe, if desired. In some embodiments, to further protect marine life and prevent object collisions, a mechanism for monitoring or detecting the presence of marine life, or certain marine life, or objects, or any combination thereof in the drive pipe or other system components may be employed, and/or, in some embodiments, if a marine life, or certain marine life, or objects, or any combination thereof may be detected in the system or in the drive pipe, the operation of the system may be paused or one or more valves may be prevented or paused from shutting or opening, or another operational change, or any combination thereof may be employed.

Some embodiments may comprise one or more or any combination of the following steps:

Water from a moving body of water enters and/or passes through a drive pipe, which may be facilitated using a flow concentrator and/or flow diffuser.

A first valve fluidly connected to the drive pipe, which may comprise a waste valve, at least partially closes, triggering or otherwise resulting in a pressure surge or pressure wave due to at least in part the water hammer effect, wherein said pressure surge or pressure wave may at least partially occur within the drive pipe, such as the fluid within the drive pipe. In some embodiments, when the waste valve at least partially closes, the flow of water through the drive pipe may at least partially stop or slow down, or the flow velocity of the water flowing through the drive pipe may at least partially decrease or slow relative to, for example, the flow velocity immediately before the first valve at least partially closed.

A second valve fluidly connected to the drive pipe, which may comprise a high pressure output port or high pressure output valve, may at least partially open, allowing at least a portion of the higher pressure water due to the pressure surge or pressure wave to at least partially exit drive pipe.

The higher-pressure output water flow from the high-pressure output port or high pressure output valve may be transferred to a downstream use or downstream application.

The second valve may at least partially close and the first valve may at least partially open, which may result in the system returning to the operating state in step 1).

In some embodiments, control systems and/or sensors may be employed or integrated. For example, some embodiments may employ systems and/or methods to monitor pressure, or flow rate, or flow velocity, or turbine performance, or any combination thereof. For example, in some embodiments, at least a portion of monitoring may be conducted in real-time and/or in some embodiments an operator may dynamically adjust the flow, or operation, or valve(s), or energy storage, or other system to match varying conditions, demand conditions, or environmental factors. In some embodiments, it may be desirable for the turbine-generator assembly to be located in at least partially accessible or accessible locations, such as surface platforms, land-based facilities, or floating vessels, which may, for example, improve convenience or cost of maintenance and/or operational oversight. In some embodiments, it may be desirable for the high-pressure output stream to drive, for example, one or more compact subsea turbines or pressure exchangers or fluid uses, which may enable localized power generation, or pressure, or other fluid or power use for, for example, subsea operations, or nearby applications, or integrated applications, or subsea operations, or offshore facilities, or subsea applications, or onshore facilities, or any combination thereof.

First Valve or Waste Valve

In some embodiments, the first valve or waste valve may be configured to optimize the water hammer effect while ensuring durability and efficiency in a subsea or aquatic environment. In some embodiments, the first valve or waste valve may comprise a self-actuating and/or spring-loaded flap valve which may be designed to open and close automatically and/or in response to the fluid dynamics within the drive pipe pump chamber. In some embodiments, the first valve or waste valve may be constructed from corrosion-resistant materials, which may include, but are not limited to, one or more or any combination of the following: marine-grade stainless steel, or titanium alloys, or advanced polymers, or polymers, or composites, or any combination thereof, for example, to withstand potentially harsh underwater conditions such as exposure to high ambient pressure and/or exposure to oxygenated and/or saline environments. In some embodiments, a valve's actuation mechanism may include a calibrated spring, or pneumatic, or hydraulic, or actuated, any combination thereof system which may enable or ensure rapid closure to enable water flow deceleration and/or generate a desired pressure surge which may be driven by the water hammer effect. In some embodiments, the flap or disc of a valve may comprise or may be coated with anti-fouling materials to minimize biofouling and/or sediment accumulation. In some embodiments, a valve housing may include channels or vents to direct sediment and debris away from the valve seat, which may prevent clogging and/or facilitate desired performance.

In some embodiments, a valve may incorporate dampers, such as hydraulic or pneumatic dampers, which may be employ to, for example, cushion a valve's movement, which, if desired, may compensate for impact forces during repetitive actuation and/or reduce wear. In some embodiments, a valve interface or seal or seating or any combination thereof may comprise solid materials or metals or plastics or other materials which may be less prone to wear or degradation from repeat operation. In some embodiments, a valve seating may use elastic seals or advanced composites to ensure a tight seal when closed, which may, for example, reduce energy losses due to leakage or prevent or minimize leakage. In some embodiments, a valve may include integrated sensors to monitor its actuation cycles and/or performance. For example, in some embodiments, valve may include integrated sensors to monitor its actuation cycles and/or performance, which may involve transmitting data to a control system for predictive maintenance, problem detection, and/or operational optimization. In some embodiments, the geometric of a valve, such as its angle of operation and/or size relative to the drive pipe or pump chamber, may be customized based on the system's flow dynamics to achieve desired pressure amplification and efficiency.

In some embodiments, a Reed Valve Design may be employed. For example, in some embodiments, a reed valve may comprise a flexible strip of material which may bend under the force of water flow to, for example, allow passage of fluid and/or return to its original position or state to at least partially close the fluid channel, for example, when flow subsides. In some embodiments, materials for a reed may be selected from high-performance composites or corrosion-resistant metals which may be capable of withstanding subsea or aquatic conditions.

In some embodiments, a Venturi-Based Passive Valve, or Venturi-Based Active Valve, or any combination thereof may be employed. For example, in some embodiments, a valve may comprise a venturi mechanism which may, for example, create a pressure differential which may passively open and close a valve, or flow. In some embodiments, a Venturi based approach may reduce reliance on some mechanical actuation components, and/or may provide a low-maintenance solution, and/or may be useful in many environments, including, for example, environments with consistent flow rates.

In some embodiments, a Hinged Disc Valve may be employed. For example, in some embodiments, a valve may comprise a pivoting disc which may at least partially open under the force of incoming water, if desired, or due to other passive or active mechanism or direction, and/or closes due to gravity, spring tension, or flow reversal, or other passive or active mechanism or direction, or any combination thereof. In some embodiments, a hinge mechanism may be at least partially sealed to prevent or minimize potential water intrusion or otherwise made suitable for marine or aquatic environments, and/or a disc may include flow-stabilizing fins which may, for example, reduce turbulence.

In some embodiments, a Ball Valve, which may employ a Floating Mechanism, may be employed. For example, in some embodiments, a valve may comprise a ball valve, which may employ a floating mechanism, may be employed and/or may enable more precise control over the waste flow. In some embodiments, a ball may be suspended within a valve housing and/or the ball may move based on, for example, flow and/or pressure dynamics, and/or at least partially sealing or opening the valve as desired. In some embodiments, a ball valve may provide significant sealing performance and/or may be resistant to wear.

In some embodiments, a Smart Actuated Valve, which may employ a Floating Mechanism, may be employed. For example, in some embodiments, a valve actuated, such as may be electronically or hydraulically actuated, which may enable more precise control over the timing and/or frequency and/or degree of a valve's operation. In some embodiments, sensors may be integrated into the valve and/or adjacent to the valve and/or fluidly connected to the valve and/or may monitor flow rate, or pressure, or temperature, or other conditions, and/or an onboard controller may adjust the valve's actuation to, for example, optimize system performance or adjust to desired operations or needs or objectives.

In some embodiments, a Flap Valve, which may employ an Elastic Diaphragm, may be employed. In some embodiments, a valve may comprise a flap mechanism. In some embodiments, a valve may comprise a flap mechanism which may be combined with an elastic diaphragm, which may, for example, dampen pressure surges and/or enhance sealing. The diaphragm may absorb energy during valve closure and/or improve seal, which may reduce wear on the flap, and/or reduce potential leakage, and/or improve system lifespan. In some embodiments, a Flap Valve and/or Elastic Diaphragm may be useful in systems or environments with high flow variability and/or the diaphragm may enable adaptation to changing pressures or variable pressures or changing flows.

The valve designs applicable to the First Valve or Waste Valve may also be applicable to the Second Valve, or other valves described herein, or other valves, or other flow control mechanisms, or other ports, or any combination thereof.

In some embodiments, one or more or any combination of valves may be integrated in parallel, or series, or adjacent, or any combination thereof.

Second Valve or High Pressure Output

In some embodiments, the second valve or high-pressure output valve may be configured to allow efficient flow of pressurized water to the output system or downstream applications and/or may at least partially prevent backflow into the drive pipe or pump chamber. In some embodiments, a valve may comprise a check valve and/or may be constructed from suitable materials capable of withstanding the high-pressure and/or corrosive environment which may be found in subsea or aquatic or marine environments. In some embodiments, said suitable materials may include, but are not limited to, for example, including, but not limited to, marine-grade stainless steel, or titanium, or composites, or ceramics, or any combination thereof, and/or materials and/or construction may be selected or chosen based on, for example, including, but not limited to, one or more or any combination of the following: durability, or corrosion resistance, or ability to handle dynamic loads over extended operational periods. In some embodiments, a valve may comprise a spring-loaded disc or ball mechanism which may, for example, close, potentially automatically, under backpressure, which may, in some embodiments, enable an at least partially unidirectional flow of water to the output system or high-pressure output to downstream applications, or further concentrating or pressurization, or any combination thereof. In some embodiments, a valve seating surface may utilize elastic seals or hard-coated materials to maintain a tight seal and minimize leakage under high-pressure conditions.

In some embodiments, a valve may comprise hydraulic or pneumatic dampers which may at least partially, if desired, control the speed of valve closure. In some embodiments, a valve's geometry, such as its diameter and/or actuation approach or actuation force, may be customized based on the system's flow rate and/or pressure requirements. In some embodiments, anti-fouling coatings or bioinspired surfaces may be employed or applied to valve components, which may be desirable to reduce or prevent marine growth and/or sediment accumulation and/or ensure consistent operation in harsh environments. In some embodiments, a valve may integrate sensor, for example, to monitor pressure, or flow rate, or valve position, or any combination thereof and/or transmit data to a control system for diagnostics and predictive maintenance.

In some embodiments, a valve may comprise a Check Valve.

In some embodiments, a Ball Check Valve may be employed. In some embodiments, a valve may comprise a ball check valve, which may comprise, for example, a spherical ball which may be seated within a valve housing and/or may allow fluid to flow primarily in one direction by at least partially unseating under pressure. In some embodiments, when backpressure may be applied, the ball may reseat itself, which may at least partially create a seal which may at least partially prevent reverse flow. In some embodiments, a ball may be made from wear-resistant materials, which may include, but is not limited to, for example, ceramic or tungsten carbide, and/or may be desired to endure prolonged exposure to high pressures and repeat operation.

In some embodiments, a Flap Check Valve may be employed. In some embodiments, a valve may comprise a flap check valve may be used wherein, for example, a hinged flap may open, for example when pressurized fluid flows toward the output system and/or the hinged flap may close under backpressure. In some embodiments, the hinge mechanism may include, for example, spring, or hydraulic, or pneumatic, or any combination thereof assistance, which may enable, for example, faster closure and/or may improve sealing performance. In some embodiments, a Flap Check Valve may be desirable for high-capacity flow handling. In some embodiments, the flap may incorporate flow-stabilizing fins, which may, for example reduce turbulence and/or potential energy losses and/or leakage.

In some embodiments, a Double-Door Valve may be employed. In some embodiments, a double-door valve may be employed, for example, wherein two flaps, which may be semi-circular, may pivot inward to allow or increase fluid flow and/or close outward under backpressure block or decrease fluid flow. In some embodiments, a Double-Door Valve may reduce or minimize a valve's opening and/or closing time, which may, for example, reduce hydraulic losses and/or enhancing system efficiency. In some embodiments, a double-door mechanism may be effective in high-flow-rate systems, and/or may be constructed from lightweight and/or durable materials which may reduce wear and optimize inertia.

In some embodiments, a Smart Actuated Output Valve may be employed. For example, in some embodiments, a smart actuated valve may be integrated into the system, and/or may employ electronic or hydraulic actuation to control, for example, the timing, or degree, or duration, or any combination thereof of valve opening and/or closure. Some embodiments may comprise integrated sensors which may monitor flow rate, or pressure, or valve performance, or any combination thereof in real time, and/or may enable dynamic adjustment based on operating conditions.

In some embodiments, a Diaphragm Check Valve may be employed. For example, in some embodiments, a diaphragm check valve may be employed, for example, wherein an elastic diaphragm may flex to, for example, at least partially allow pressurized water to flow toward the output system and/or the elastic diaphragm may at least partially return to its original position to at least partially block reverse flow. In some embodiments, a Diaphragm Check Valve my provides a soft closure, which may reduce wear on valve components and/or downstream components or systems. In some embodiments, diaphragm materials, such as reinforced elastomers or high-performance polymers, may be selected to handle the high-pressure and corrosive conditions of subsea, or marine, or aquatic, or moving, or any combination thereof environments.

In some embodiments, a Venturi-Assisted Valve, may be employed. For example, in some embodiments, a venturi-assisted valve may be used to enhance flow efficiency. For example, in some embodiments, a Venturi-Assisted Valve may employed a venturi geometry which may enable or create a pressure differential which may naturally encourage fluid flow in one direction and/or while at least partially preventing backflow. In some embodiments, a venturi-assisted design may be energy-efficient and/or less complex, and/or may reduce reliance on mechanical actuation and/or may be a low-maintenance option enabling greater reliability and lifespan.

The valve designs applicable to the Second Valve or High Pressure Output valve or High Pressure Output port or High Pressure Output may also be applicable to the First Valve, or other valves described herein, or other valves, or other flow control mechanisms, or any combination thereof.

Flow Concentrator

In some embodiments, a flow concentrator may be designed to increase the velocity and kinetic energy of water entering a drive pipe and/or while potentially minimizing turbulence and energy losses. In some embodiments, a flow concentrator may comprise a funnel-shaped structure which may comprise a wide intake that may gradually narrow toward an outlet which may transfer fluid or direct fluid into, for example, the drive pipe, which may, if desired, accelerate flow. In some embodiments, the geometry of a flow concentrator may follow a streamlined design, and/or may employ hydrodynamic principles to guide water smoothly through the narrowing section. In some embodiments, an intake opening may be employed and/or may feature a protective grill or mesh to prevent debris and large particles from entering the system, and/or reduce the risk of blockages and wear on downstream components.

In some embodiments, external and/or internal surfaces may be coated with anti-fouling materials, or textured surfaces, or bioinspired patterns, or any combination thereof to, for example, at least partially prevent marine growth and/or sediment accumulation. In some embodiments, a flow concentrator may comprise flow-stabilizing vanes or baffles, which, if desired, may align water flow with the axis of the drive pipe and/or may reduce turbulence and/or optimize flow transfer. In some embodiments, a flow concentrator may comprise integrated sensors to monitor flow velocity, or direction, or turbulence, or any combination thereof and/or may transmit data, which may be real-time, to a control system, for example, for operational adjustments. The size and taper angle of the concentrator may be customizable based on the site-specific flow characteristics and/or may be adjustable, and/or may ensure scalability and/or adaptability to a potentially fluctuating, and/or variable subsea currents.

In some embodiments, a Multi-Channel Flow Concentrator may be employed. For example, in some embodiments, a flow concentrator may comprise multiple intake channels which may be arranged, for example, in a radial pattern around a central output, which may be fluidly connected or directly connected to the drive pipe. In some embodiments, each channel may guide water toward the drive pipe, and/or allow the system to capture flows from multiple directions. In some embodiments, a Multi-Channel Flow Collector or Concentrator design may be beneficial for environments with variable or multi-vector currents, such as tidal streams or currents. In some embodiments, flow-stabilizing vanes may be integrated into each channel, which may enable, if desired, at least partially uniform flow distribution.

In some embodiments, an Active Adjustable Concentrator may be employed. In some embodiments, an active adjustable flow concentrator may employ motorized or hydraulic actuators to, for example, modify shape or aperture size dynamically. In some embodiments, the concentrator may adapt to changing flow conditions, such as varying velocities or directions. For example, in some embodiments, the intake opening may expand during periods of low flow to maximize capture area and/or contract during high-flow or high sediment conditions to, for example, maintain optimal velocity, or power production, or ensure operational longevity.

In some embodiments, a Fixed Venturi Concentrator may be employed. In some embodiments, a venturi-shaped flow concentrator may be employed, for example, wherein a narrowing section may accelerate the flow or flow velocity by, for example, creating a pressure differential. In some embodiments, a venturi concentrator may be a passive design, or active design, or any combination thereof.

In some embodiments, a Rotational Flow Concentrator may be employed. In some embodiments, a rotational flow concentrator may enable or facilitate operation in environments with swirling or chaotic flows. In some embodiments, a Rotational Flow Concentration may employ spiral-shaped vanes or baffles within the concentrator to, for example, align the flow into more a uniform, axial direction, for example, before or while entering the drive pipe. In some embodiments, a Rotational Flow Concentrator may reduce turbulence and/or energy losses and/or facilitate operation in sites with complex hydrodynamic conditions.

In some embodiments, a Modular Flow Concentrator may be employed. In some embodiments, a modular flow concentrator may comprise potentially interchangeable sections, which may allow the system to be customized for different flow rates and/or site-specific conditions. For example, customizable configurations may be useful in regions with periodic or seasonal changes in flow rates, or current speeds, or current vectors, or flow velocities, or flow directions, or any combination thereof. For example, in some embodiments, the intake module may be swapped for a larger or smaller aperture, or the tapering section may be adjusted to alter the acceleration rate, or the direction or position of the flow concentration may be changed or adjusted to reflect changes in the direction or velocity of moving water flows.

In some embodiments, Biomimetic approaches, such as a Biomimetic Flow Concentrator may be employed. For example, a flow concentrators may at least partially mimic the shapes or patterns of fish or marine animals and/or a flow concentrator may feature curved and textured internal or external surfaces. In some embodiments, a Biomimetic approach may minimizes turbulence and energy losses, and/or may enhance the system's resistance to biofouling and/or may enable improved integration or symbiosis with the marine environment.

In some embodiments, a Floating Intake Flow Concentrator or Suspended Intake Flow Concentrator or Tethered Intake Flow Concentrator may be employed. In some embodiments, a Floating Intake Flow Concentrator may be positioned at a depth or elevation wherein it may maintain a more optimal position in the water column, for example, to better capture or capture more power from currents, or to avoid sediment, or minimize impacts to marine life, or any combination thereof. In some embodiments, the depth and/or position of the intake or flow concentrator or other system components may be adjustable. In some embodiments, a floating design may ensure or enable an intake may be in the an energy-rich or power-rich section of a current or moving body of water, which may enable greater power generation capacity, or power output, or energy efficiency.

Flow Diffuser

In some embodiments, a flow diffuser may be employed and/or may be designed to decelerate and/or distribute and/or 'pull' the water flow exiting the drive pipe or waste flow efficiently and/or may at least partially minimize turbulence and/or energy losses and/or protect or facilitate harmony with the surrounding environment. In some embodiments, a diffuser may comprise a conical or flared structure that may gradually expand from the drive pipe to a larger cross-sectional area and/or may reduce the velocity of the outgoing water and/or may enable a smooth flow transition. In some embodiments, it may be desirable for the taper angle of the diffuser to be optimized to at least partially prevent flow separation and turbulence, and/or may ensure or enable a controlled and/or efficient energy dissipation process. In some embodiments, for example, a taper angle of, for example, 7° to 15°, may be employed.

In some embodiments, the internal and/or external surfaces of a diffuser may comprise or may be coated with anti-fouling materials and/or designed with textures which may prevent marine growth and/or sediment buildup.

In some embodiments, Flow-stabilizing vanes or baffles may be integrated or otherwise employed, for example, within the diffuser to, for example, guide water flow as it transitions from a higher velocity to lower velocity. In some embodiments, a diffuser or diffuser outlet may comprise features such as perforated plates or multi-jet nozzles, which may distribute water over a wider area and/or may reduce localized erosion or scouring on the seabed or marine environment and/or may improve environmental impact. In some embodiments, sensors may be embedded within the diffuser to monitor flow rate, pressure, and velocity and/or may provide real-time feedback to optimize system operation. The diffuser's size, shape, and materials may be customized based on the specific flow conditions and environmental requirements and/or may be configured to ensure adaptability across a range of applications.

In some embodiments, a Multi-Stage Diffuser may be employed. For example, in some embodiments, multi-stage diffuser may enable gradual reduction in flow velocity. For example, in some embodiments, multiple sequential expansion chambers may be employed, for example, wherein each chamber may comprise a slightly larger diameter.

In some embodiments, a Venturi-Based Diffuser may be employed. For example, in some embodiments, a venturi-based diffuser may comprise a combination of constricted section(s) followed by an expansion zone(s). In some embodiments, a constriction may increase the velocity momentarily, which may create a low-pressure zone, and/or expansion point may enable the flow to expand and slow. In some embodiments, a Venturi-Based Diffuser may enable more passive operation of valves in the system.

In some embodiments, a Radial Flow Diffuser may be employed. For example, in some embodiments, a diffuser may be designed to redirect the water radially outward through a series of curved channels or vanes.

In some embodiments, an Adjustable Diffuser may be employed. For example, in some embodiments, an adjustable flow diffuser may comprise movable vanes or apertures which may change or adjust flow pattern, potentially dynamically and/or based on operational requirements. For example, in some embodiments, the outlet area may expand or contract to, for example, accommodate variations in flow rate or pressure.

In some embodiments, a Perforated Plate Diffuser may be employed. For example, in some embodiments, a perforated plate diffuser may comprise a series of small and/or distributed holes through which the water may be discharged.

In some embodiments, a biomimetic diffuser may be employed and/or may be desired based on natural diffusion patterns, such as coral formations or fish gills, and/or may incorporate internal geometries to decelerate and distribute the flow efficiently. In some embodiments, a biomimetic design may reduce turbulence and/or energy losses and/or may at least partially blend with the natural environment.

In some embodiments, a Diffuser may be employed with Energy Recovery. For example, in some embodiments, a diffuser or an inline diffuser may be combined with an energy recovery mechanism, such as a small turbine or pressure exchanger, to capture residual energy or power.

Power Generation

In some embodiments, a power generation system may be employed. For example in some embodiments, a power generation system may utilize the high-pressure output water stream to drive a hydroelectric turbine, converting hydraulic energy into mechanical energy and/or electrical energy. In some embodiments, turbine designs may include, but are not limited to, one or more or any combination of the following: an impulse turbine, or a Pelton turbine, or Turbo turbine, or Kaplan Turbine, or Propeller Turbine, or Cross-Flow Turbine, or Bulb Turbine, Very Low-Head (VLH) Turbine-Heads 1.5-4.5 m, high flow, or savonius turbine, or impeller, or vertical axis turbine, or horizonal azis turbine, or foil turbine, or push turbine, or Archimedean Screw Turbine, or Gravity Turbine, or Low-Head Francis Turbine, or Francis Turbine, or Hydrokinetic Turbine, or Tube Turbine, or Horizontal Kaplan/propeller variant turbine, or low pressure turbine, or medium pressure turbine, or high pressure turbine, or any combination thereof.

In some embodiments, a turbine may be constructed from corrosion-resistant materials, such as such as stainless steel, titanium, or advanced composites, and/or the turbine may be designed to withstand harsh subsea conditions, including high salinity, and/or pressure, and/or exposure to biofouling organisms. In some embodiments, the turbine may include self-cleaning mechanisms, such as high-pressure water jets or coatings that reduce marine growth. In some embodiments, the turbine may be proportionally compact and/or may be located in a more accessible location than, for example, the drive pipe. In some embodiments, flow-stabilizing components, such as nozzles or guide vanes or pressure regulators or pressure stabilizers or flow stabilizers, may be employed or integrated.

In some embodiments, the power generation design may include sensors to monitor flow rate, pressure, turbine speed, and/or generator output. In some embodiments, sensors may be linked to a control system which may optimize performance by, for example, adjusting turbine operation dynamically based on real-time or predicted flow conditions. In some embodiments, a turbine-generator assembly may be located on an accessible platform, such as a floating vessel, offshore wind turbine tower, or tower, or land-based facility, or accessible underwater location, or any combination thereof, which may simplify maintenance and operation. In some embodiments, the generated power may be used directly, or transferred, or stored in battery systems, or transmitted via subsea cables to offshore and/or onshore facilities.

In some embodiments, the high-pressure water stream may drive a compact subsea turbine. In some embodiments, it may be desirable for the subsea turbine to be integrated directly into or adjacent to drive pipe or related assembly. In some embodiments, the proximity between the subsea turbine and other system components may reduce or eliminate the need to transport pressurized water to the surface, which may reduce energy losses and infrastructure complexity, while achieving the objective of reducing the proportional size of subsea power generating components, enabling longevity and resilience, and environmental friendliness. In some embodiments, a subsea turbine or subsea pressure exchanger may be beneficial localized power generation, or power conversion, or power storage, or any combination thereof for offshore installations, such as oil rigs, or oil & gas platforms, or subsea processing, or subsea pipelines, or subsea flow lines, or subsea electricity or power demands, or aquaculture systems, or underwater observation platforms, or subsea power cables, or subsea power substations, or any combination thereof.

In some embodiments, a turbocharger-based system may be employed. For example, in some embodiments, a turbocharger based system may employ the high-pressure water output to drive a turbocharger which may pressurize or transfer pressure and/or power to a secondary fluid, such as a liquid, or fluid, or gas, or any combination thereof.

In some embodiments, a pressure exchanger may be employed. In some embodiments, a pressure exchanger may be used to transfer energy or power from the high-pressure water output stream to a secondary fluid, such as, including, but not limited to, a liquid, or gas, or fluid, or seawater, or brine, or oil, or hydrocarbon, or any combination thereof, which may enable use of the mechanical or hydraulic energy and/or may enable energy storage and/or may enable fluid flow stabilization.

In some embodiments, the high pressure water may be transferred into a reverse osmosis desalination process. In some embodiments, it may be desirable to upgrade or further increase the pressure of the high pressure fluid before or during transfer into a reverse osmosis or other pressure driven desalination process. In some embodiments, it may be desirable to extract at least a portion of pressure or power from at least a portion of the high pressure water before it is transferred into the desalination system.

In some embodiments, a Floating Platform may house Power Generation. For example, in some embodiments, the high-pressure output may be transported via conduits or pipes, such as flexible conduits, to a turbine-generator assembly mounted on or otherwise connected to or situated on a floating vessel. In some embodiments, the floating vessel may be swappable or modifiable, and/or the floating vessel may use the power directly, or may be connected to uses of the power, or the power may be transferred to other locations, or uses, or applications, or any combination thereof. In some embodiments, the floating platform may integrate with other renewable and/or non-renewable energy sources, such as wind, or solar power, or diesel or natural gas combustion power generation or the electricity grid, to create, if desired, a hybrid power generation system.

In some embodiments, a Land-Based Power Generation may be employed. In some embodiments, a Land-Based Power Generation may be employed, wherein, for example, the pressurized water stream or high pressure water output may be transported via a conduit, such as a pipe, to a land-based facility which may house a turbine-generator assembly, which may generate power.

In some embodiments, multiple units may be deployed and/or their high-pressure outputs may be combined into a single manifold feeding a single turbine or multi-turbine or multi-component system. Multi-Flow and/or Multi-Turbine Systems may be advantageous for large-scale energy generation projects.

In some embodiments, a Hybrid Energy System may be formed or integrated or employed. For example, in some embodiments, the high-pressure water stream or high pressure output stream may be integrated into hybrid energy systems combining energy sources such as wind or solar or grid electricity or energy storage or combustion power generation or other power or energy sources, which may enhance overall system reliability and efficiency.

In some embodiments, Direct Mechanical Energy Applications may be formed or integrated or employed. In some embodiments, the high-pressure water or high pressure output stream may directly drive mechanical systems, such as pumps or compressors or pressure exchangers or injectors. For example, in some embodiments, direct mechanical energy applications may be applicable to offshore or subsea operations requiring hydraulic actuation, or injection, or pumping, or pumping fluid in a pipeline or flowline, or industrial processes such as fluid transport or oil & gas or mining, or any combination thereof.

In some embodiments, the high-pressure water stream or high pressure output stream may be transferred using, for example, a conduit or pipe, to a higher elevation reservoir, or tank, or location, or any combination thereof, such as onto a bridge, or bridge span, or tower, or wind turbine base, or wind turbine tower, or cliff, or platform, or oil platform, or lighthouse, or water tower, or any combination thereof. In some embodiments, water or other fluid in the higher elevation reservoir transfer through a pipe or conduit to a turbine and/or generator located at a lower elevation, which may result in the generating of power, such as a electricity, or mechanical power, or hydraulic power, or any combination thereof. In some embodiments, the use of a higher elevation reservoir or higher elevation structure to, for example, create a gravity store, may enable smoother power delivery and/or energy storage, which may be similar to water towers employed in municipal water systems. Some embodiments may utilize or employ existing higher elevation infrastructure, such as wind turbines or bridges. For example, in some embodiments, an underwater unit may be located under a bridge with moving water or currents passing underneath, and/or, in some embodiments, the high-pressure water stream or high pressure output stream may be transferred to a reservoir, which may comprise a tank, which may mounted to or otherwise located on or attached to a location on the bridge which may be at a significantly higher elevation than the surface of the water beneath bridge, and/or power may be generated by allowing water to exit the reservoir through a conduit or pipe into a turbine and/or generator, generating power or electricity, and/or said turbine and/or generator may be located at a lower elevation than the reservoir such as an elevation, for example, near the elevation of the water surface or water level beneath or underneath the bridge. In some embodiments, high-pressure water streams or high pressure output streams produced by multiple units may be combined into a one or more streams, for example, using a manifold. In some embodiments, high-pressure water streams or high pressure output streams produced by multiple units may be transferred to a single reservoir, which may be located at a higher elevation, and said reservoir may enable the aggregation of these streams, or the smoothing of power, or conversion of the pressure or gravitation power or energy into electricity or other useful work, or any combination thereof, and/or water may be transferred from said reservoir through a pipe or conduit to one or more turbines or generators or other mechanisms for conversion of the water flow into useful work or power or electricity.

Drive Pipe and/or Pump Chamber

In some embodiments, a drive pipe and/or pump chamber, which may be used interchangeably in some embodiments, may be designed to efficiently transfer kinetic energy from the incoming water flow in a manner which may facilitate the water hammer effect to amplify pressure. In some embodiments, the internal diameter (DDD) and length (LLL) of the drive pipe and/or pump chamber may be optimized. For example, in some embodiments, the drive pipe and/or pump chamber may have a ratio of Length to Diameter ranging from 5:1 to 12:1, or 20:1, or 50:1, or 100:1. In some embodiments, the drive pipe and/or pump chamber's length and diameter may be determined based on the flow rate, velocity, desired pressure amplification, or other parameters, or any combination thereof, and/or, in come embodiments, wherein larger diameters may be employed for higher-volume flows and/or longer lengths for greater pressure amplification.

In some embodiments, the drive pipe and/or pump chamber may comprise smooth, hydrodynamically optimized internal surfaces to reduce friction and turbulence and/or enable greater energy transfer efficiency. In some embodiments, anti-fouling coatings or textures may be employed or applied to, for example, prevent or reduce potential accumulation of marine growth or sediment. In some embodiments, flow-stabilizing vanes or baffles may be installed within the pipe to align and maintain a desired flow or flow characteristics.

In some embodiments, the drive pipe may include integrated monitoring systems, such as pressure transducers and/or flow meters, which, if desired, may provide real-time data on flow conditions, and/or pressures, and/or energy transfer efficiency. In some embodiments, the drive pipe and/or pump chamber may be anchored securely to the seabed using modular supports or hydrodynamically shaped mounts to prevent movement or vibration under high flow conditions and/or may be suspended or tethered above the seabed. In some embodiments, the drive pipe may include self-cleaning mechanisms, such as high-velocity water jets or pressure waves, to remove debris and prevent blockages.

In some embodiments, the drive pipe, or pump chamber, or integrated system, or any combination thereof may be at least partially suspended, or tethered, or otherwise located above the seafloor or floor of the body of water to, for example, prevent sediment buildup.

In some embodiments, a Flexible Drive Pipe may be employed. For example, in some embodiments, the drive pipe may be constructed from flexible materials, such as reinforced rubber or polymer composites, allowing it to adapt to varying subsea terrain, or transverse longer distances, or allow for movement caused by ocean currents or settling, or any combination thereof.

In some embodiments, a Tapered Drive Pipe may be employed. For example, in some embodiments, a tapered drive pipe may gradually narrow from the intake to, for example, increase water velocity and kinetic energy, which may, for example, enhance the water hammer effect and/or enhance pressure amplification.

In some embodiments, a Multi-Pipe Configuration may be employed. For example, in some embodiments, a Multi-Pipe Configuration may comprise multiple parallel drive pipes, wherein each pipe may be optimized for a specific portion of the flow, and the outputs are combined into a drive pipe and/or pump chamber to achieve, for example, a desired pressure amplification or a reduced number of valves or moving parts.

In some embodiments, a Venturi-Enhanced Drive Pipe may be employed. For example, in some embodiments, a venturi-enhanced drive pipe may comprise a venturi section to accelerate the flow, which may create localized pressure differentials which may enhance the water hammer effect.

In some embodiments, a Modular Drive Pipe may be employed. For example, in some embodiments, a modular drive pipe may employ interchangeable sections which may allow for easy customization and maintenance. For example, in some embodiments, any damaged sections may be replaced and/or additional sections can be added or removed to adjust the pipe's length or shape to optimize performance.

In some embodiments, a Reinforced Drive Pipe may be employed. For example, in some embodiments, a reinforced drive pipe may comprise additional structural supports, such as internal ribs or external bracing, which may prevent deformation or collapse under operational stresses.

In some embodiments, a Curved Drive Pipe may be employed. For example, in some embodiments, a curved or bent drive pipe may be employed to accommodate complex subsea terrain and/or integrate with existing infrastructure. For example, in some embodiments, a curved or custom shaped drive pipe may be useful for installations requiring custom or flexible alignment with natural or man-made obstacles.

Stacking or Integration of Multiple Units

In some embodiments, a stacking or integration configuration may be employed. In some embodiments, stacking may comprise configuring multiple hydraulic ram pumps in a sequential arrangement, such that the high-pressure output of a first unit serves as the input feed to a second unit, thereby further increasing the pressure of the output flow for downstream applications. In some embodiments, a stacking configuration may utilize the inherent water hammer effect of each pump stage to progressively amplify the pressure, potentially enabling the system to achieve pressures and/or power densities and/or flow densities exceeding those achievable by a single unit.

In some embodiments, each unit, which may also be referred to as a ram pump stage or stage pump, may be designed to handle the specific range of volumetric flow rate, or pressures, or flow characteristics, or any combination thereof of the incoming water. In some embodiments, the drive pipe for the second-stage pump may be fed by the high-pressure output conduit of the first-stage pump. In some embodiments, the dimensions of the second-stage drive pipe, pump chamber, and/or valves may be optimized to align with the increased pressure and reduced flow rate relative to the first-stage drive pipe. In some embodiments, each stage may comprise materials and structural parameters capable of withstanding or resisting the design operating conditions.

In some embodiments, flow stabilizers, such as baffles or guide vanes, may be installed between the stages to, for example, align the incoming flow with the axis of the second-stage drive pipe, which may reduce turbulence and/or maximizing energy transfer. In some embodiments, anti-fouling coatings or surface treatments may be employed or applied throughout the system to prevent marine growth and/or sediment buildup.

In some embodiments, the system may include integrated sensors at each stage to monitor flow rates, pressures, and/or valve actuation cycles, and/or may provide real-time data to a control system for operational controls and/or optimization. In some embodiments, a stacking design may be modular and/or may allowing additional stages to be added or removed as desired to achieve the desired pressure levels for applications such as desalination, power generation, or industrial fluid transport, or other applications described herein, or other fluid pressure applications in the art, or any combination thereof.

In some embodiments, a pump stacking configuration may comprise a sequential arrangement of multiple underwater hydraulic ram pump units, for example, wherein the high-pressure output of one pump stage may serve as at least a portion of the input feed to the next stage, and/or progressively amplifying the pressure of the output water stream.

Example Features of Stacking Design in Some Embodiments

Drive Pipe Integration: The high-pressure output of the first pump may be directly fed into the drive pipe of the second pump, which may be configured to handle the increased pressure and reduced flow rate. The drive pipes of subsequent stages may have smaller diameters and/or shorter lengths, proportionally tailored to the input conditions.

Pressure Stabilization: Between each stage, a pressure stabilization mechanism, such as an accumulator or flow chamber, may be employed and/or may ensures consistent pressure and flow before entering the next pump.

Monitoring and Control: Sensors may be integrated at each stage to, for example, monitor flow rate, pressure, and/or valve actuation cycles, and/or may provide real-time data for operation controls and/or optimization. An intelligent control system may dynamically adjust valve timing and other operational parameters based on, for example, the performance of each stage and the desires of the operators.

Modular Configuration: The system may be designed with modular components, which may allow pump stages to be added or removed based on the required pressure output and specific application desires.

In some embodiments, a Parallel Flow or Parallel Pumping configuration, which may involve with Combined Outputs, may be employed. In some embodiments, multiple units may operate independently to generate high-pressure outputs, which may then be combined into a single manifold. In some embodiments, the flow may be densified by aggregating multiple high-pressure streams into one and/or increased volumetric flow rates at a higher pressure and/or reducing CAPEX.

In some embodiments, Multi-Chamber Sequential Pumping may be employed. For example, in some embodiments, a single unit may be designed with multiple chambers operating sequentially within the same system. For example, in some embodiments, the water hammer effect from the initial chamber may feed subsequent chambers and/or progressively amplifying the pressure.

In some embodiments, Inter-Stage Pressure Accumulators may be employed. In some embodiments, for example, between each stages or unit within the system, a pressure accumulator or reservoir may be integrated to, for example, stabilize and/or store the output pressure. In some embodiments, accumulators may function as energy buffers and/or may at least partially ensure consistent and/or smooth pressure or flow delivery to a downstream pump stage or downstream application.

In some embodiments, a hybrid pump-turbine, or pressure exchanger, or any combination thereof system may be employed. For example, in some embodiments, the high-pressure output of the first ram pump may drive a compact turbine or turbocharger or pressure exchanger, to, for example, amplify energy transfer or pressure before feeding into a second-stage ram pump or into a turbine generator or a downstream application.

In some embodiments, a Multi-Venturi Enhanced Stage system may be employed. For example, in some embodiments, each stage or unit, or between each stage or unit, or any combination thereof may comprise a venturi section to further accelerate and concentrate the flow before entering the next unit or stage.

In some embodiments, a Cascading Pressure Exchanger system may be employed. For example, in some embodiments, a pressure exchanger may be integrated between stages to transfer hydraulic energy from the high-pressure output of one pump stage to another pump stage, or to a downstream application, or any combination thereof.

In some embodiments, Variable Geometry Drive Pipes and/or Pump Stages and/or Units may be employed. For example, in some embodiments, to accommodate fluctuating input conditions or varying operational requirements, each stage or unit may include adjustable geometry components, such as variable-diameter drive pipes or modifiable chamber volumes. In some embodiments, variable geometry or custom geometry may enable a single unit to function as multiple or more than one ram pump or pump stage or unit, for example, which may enable greater pressure amplification from a single unit.

In some embodiments, High-Pressure Jet Amplification may be employed. For example, in some embodiments, the high-pressure output from a first unit may be directed into a nozzle to create a focused high-pressure jet, which may then be fed into the second-stage or unit.

In some embodiments, Hybrid Stacked and Parallel Systems may be employed. For example, in some embodiments, a combination of stacked and parallel units or stages may be employed. For example, in some embodiments, multiple first-stage pumps or units may feed into a single second-stage pump, balancing the need for high pressure and high flow capacity and/or reducing CAPEX.

Example Description of high pressure output flow-water exiting pipe or pump chamber through the second port or valve, which may be desirably at a higher pressure than adjacent water at the same water depth or elevation or which may be desirably at a higher pressure than the water entering the pump chamber or pipe.

In some embodiments, the system may significantly reduce the need for moving parts in the subsea environment, for example, other than, for example, valves, which may enable durability and reliability and/or while reducing the likelihood of mechanical failure due to sediment, biofouling, or other environmental factors. In some embodiments, the ability to use of smaller, more standardized or compact downstream components may allow for more simplified servicing, and/or reduce potential interference or harm to marine life, and/or improve the overall economic viability of the system.

In some embodiments, a sequential arrangement of hydraulic ram pumps may be employed to amplify the pressure and/or concentrate the flow of a fluid stream. In some embodiments, the high-pressure output from one pump may serve as the input for a subsequent pump. Each stage in the sequence may increase the overall pressure of the stream, allowing the system to achieve delivery heads or pressure levels that may exceed the capabilities of a single-stage ram pump.

In some embodiments, the hydraulic ram pumps may be stacked in parallel or hybrid arrangements to combine their outputs into a single, highly concentrated stream, which may enable the simultaneous processing of multiple input flows, which may be aggregated into a unified high-pressure output. In some embodiments, the use of sequential or stacked configurations may also support adaptive scalability, enabling operators to increase system capacity or pressure output as operational demands evolve.

In some embodiments, a combination of sequential and stacked arrangements may be employed to maximize the system's versatility. For example, a primary array of stacked ram pumps could aggregate high-pressure streams from multiple sources, while a secondary sequential configuration further amplifies the pressure for delivery to downstream components.

Pump Chamber:

In some embodiments, a pump chamber may serve as a component of the system wherein the water hammer effect may occur to convert the kinetic energy of the incoming flow into a high-pressure surge. In some embodiments, the pump chamber may be constructed from pressure-resistant materials, such as marine-grade stainless steel, duplex steel, or titanium alloys, to withstand the elevated pressures generated during operation.

To reduce pulsations in the output flow and maintain consistent pressure, the pump chamber may incorporate internal air cushions or elastic diaphragms. In some configurations, the chamber may house multiple waste valves and delivery valves, which may operate in sequence or parallel to, for example, increase system capacity and enhance operational efficiency.

In some embodiments, the pump chamber may also include modular features that may allow for scaling the system by adding or removing chambers to meet specific operational requirements. Additionally, pressure-relief valves may be integrated into the chamber to protect against over-pressurization caused by unexpected surges or blockages, and/or may improve the safety and reliability of the system.

Waste Valve:

In some embodiments, the waste valve may comprise a self-actuating mechanism configured to generate the water hammer effect by cyclically opening and closing to amplify pressure within the pump chamber. In various embodiments, the waste valve may include spring-loaded flap valves, reed valves, or venturi-based passive valves, with the specific type selected based on the flow conditions and maintenance considerations.

In some embodiments, to reduce wear caused by repetitive operation, the waste valve assembly may include hydraulic dampers or cushioning systems. Additionally, the valve housing may include debris channels that may allow sediment and particles to pass through, which may enable reliable operation in sediment-laden environments.

In some embodiments, the waste valve may further incorporate durable materials, such as composites or ceramic-coated metals, to resist abrasion and extend operational life. In some embodiments, smart valves equipped with sensors may monitor opening and closing cycles, providing real-time data to optimize performance and predict maintenance requirements.

Delivery Valve and Output Conduit:

In some embodiments, the delivery valve may direct pressurized water out of the pump chamber while preventing backflow. High-capacity check valves may be employed to ensure smooth flow and minimize energy loss. The output conduit, which may transport the high-pressure flow to downstream applications, may be reinforced to handle the elevated pressures generated by the system.

In some configurations, pulsation dampers may be integrated into the conduit to ensure consistent flow, thereby improving the efficiency and reliability of connected downstream components. Modular output conduits may be extended to reach remote locations, such as floating platforms, land-based facilities, or elevated towers, enabling versatile deployment. Additionally, embedded pressure sensors in the conduit may provide real-time feedback on flow conditions, facilitating monitoring and control.

Structural Anchoring System:

In some embodiments, the system may be secured to the seabed using advanced anchoring techniques configured to ensure stability in high-flow environments. Depending on the seabed conditions and flow dynamics, suction anchors, gravity-based foundations, or pile-driven supports may be employed. Hydrodynamic shaping of the structural base may reduce drag and scouring effects, ensuring the stability and longevity of the installation.

In some embodiments, modular anchoring systems may allow for rapid deployment and reconfiguration based on environmental or operational needs. Anti-scour mats or sediment stabilization systems may also be implemented to minimize environmental disruption and maintain the integrity of the installation site.

Energy Transformation and Applications

Some embodiments may transform energy from large, open volumetric flows into a concentrated high-pressure flow.

In some embodiments, for power generation, the high-pressure flow may drive compact hydroelectric turbines located in accessible environments, such as onshore facilities, or offshore facilities, or floating platforms. By reducing the volumetric flow required by the turbines and/or increasing the energy density of the flow, the system may enable smaller, more manageable equipment that may enable similar or equivalent power output, thereby reducing system complexity and maintenance costs.

Scalability and Adaptability

In some embodiments, the modular design of the system may allow multiple units to operate in parallel, increasing capacity and redundancy. Large-scale installations may integrate several pump chambers and drive pipes to harness energy from extensive tidal or ocean currents. The system's adaptability may enable deployment in diverse subsea environments, including tidal streams, ocean currents, and deep-sea locations, with customizable drive pipe lengths, diameters, and chamber configurations to suit a wide range of flow conditions.

In some embodiments, the ability to relocate power-generating components to accessible locations may reduce maintenance complexity and operational costs. The system may minimize subsea moving parts, limiting underwater operation to the pump valves, while turbines, desalination systems, and/or other components may be relocated above water or in a more accessible location. This reduction in subsea complexity may enhance reliability and maintainability, making some embodiments a low-impact, economically viable alternative to traditional tidal turbines and subsea fluid-processing systems.

Self-Cleaning Features, Monitoring, and Operations

Some embodiments may incorporate various self-cleaning mechanisms and monitoring features to ensure long-term operational reliability and efficiency in harsh underwater environments. These features may address challenges associated with sediment buildup, biofouling, and mechanical wear, and may include active cleaning systems, passive anti-fouling measures, and real-time monitoring technologies.

Self-Cleaning Features

In some embodiments, the system may include active cleaning mechanisms designed to dislodge sediment and prevent the accumulation of biofouling. In some embodiments, high-velocity water jets may be integrated within the drive pipe, pump chamber, or valve housings to flush debris and sediment out of the system during operation. These jets may operate continuously or periodically, based on flow conditions or pre-programmed schedules. In some embodiments, the water jets may utilize flow from the primary stream or a secondary high-pressure feed to create a cleaning force sufficient to dislodge particles.

In some embodiments, scraping mechanisms may also be incorporated to provide physical cleaning of internal surfaces and/or may include brushes, wipers, or abrasive liners positioned within the drive pipe or valve assemblies. In some embodiments, the scraping components may be self-actuating, using the flow of water to drive their movement, or may be activated by an external control system. Some mechanisms may prevent hard deposits or marine growth from adhering to internal surfaces.

In some embodiments, passive anti-fouling measures may enhance the system's resistance to biofouling, or sediment buildup, or corrosion, or any combination thereof. Surfaces exposed to seawater, such as the drive pipe and valve interiors, may be coated with anti-fouling materials such as polytetrafluoroethylene (PTFE) or polymer coatings. Some coatings may reduce the adhesion of marine organisms, silt, and other debris, which may reduce the frequency and intensity of cleaning. In some embodiments, the system may employ hydrodynamically shaped surfaces to naturally resist sediment accumulation and redirect debris away from some areas, such as, for example, critical areas.

Monitoring and Diagnostics

In some embodiments, the system may incorporate a range of monitoring technologies to enable real-time diagnostics and predictive maintenance. Sensors may be embedded in key components, such as the drive pipe, pump chamber, and valves, to measure parameters including pressure, flow rate, temperature, and valve actuation cycles. Data collected from these sensors may be transmitted to a surface platform, floating vessel, or land-based control station via wired or wireless communication systems.

In some embodiments, monitoring features may include flow condition sensors to detect blockages or reductions in flow efficiency caused by sediment or biofouling. For example, pressure sensors may measure the operational pressures within the pump chamber and output conduit, and/or may provide early warning of over-pressurization or performance degradation. For example, valve position sensors may track the opening and closing cycles of the waste and delivery valves, and/or may identify irregularities or wear.

In some embodiments, collected data may be processed by a control system, which may be capable of generating alerts or maintenance recommendations. For example, if the sensors detect a gradual increase in flow resistance, the system may automatically initiate an active cleaning cycle using water jets or scrapers. For example, if valve cycle counts exceed a predefined threshold, the system may recommend preventive maintenance to replace or repair the affected components.

Operational Adaptability

In some embodiments, self-cleaning and monitoring features may be configured to adapt to varying environmental conditions and operational requirements. For example, in some embodiments, cleaning cycles may be adjusted based on flow characteristics, sediment concentrations, or marine growth rates observed in the deployment location. For example, in some embodiments, for example in high-sediment environments, the system may increase the frequency of active cleaning cycles or deploy additional scraping mechanisms. For example, in some embodiments, passive anti-fouling measures may be sufficient.

In some embodiments, the monitoring system may also support remote operation and control, and/or may allow operators to optimize system performance. In some embodiments, software interfaces may provide real-time visualizations of sensor data and allow for manual adjustments to cleaning schedules, valve operations, or other system parameters. In some embodiments, the system may integrate with larger networked infrastructure, such as offshore energy grids or water processing facilities, to, for example, enable coordinated operations across multiple units.

Power Generation

In some embodiments, the system may integrate with subsea power generation or co-located power conversion equipment, such as subsea hydroelectric generators, pressure exchangers, turbines, desalination systems, or turbochargers.

Subsea Hydroelectric Generation

In some embodiments, the high-pressure output of the hydraulic ram pump may drive a subsea hydroelectric generator. The generator may include a compact turbine assembly configured to convert the pressurized flow into mechanical energy, which may then be converted to electrical energy using a coupled generator. In some embodiments, by concentrating the energy of a large volumetric flow into a smaller, high-pressure output, the system may reduce the size of the turbine required to achieve equivalent power output, and/or may lead to cost savings in materials, fabrication, and installation while also simplifying maintenance procedures.

Subsea Pressure Exchanger

In some embodiments, the hydraulic ram pump system may interface with a subsea pressure exchanger. For example, in some embodiments, pressure exchanger may be configured to transfer the high-pressure flow of the system output stream to a secondary fluid, such as seawater or brine. For example, in some embodiments, the pressure exchanger may be utilized in a subsea desalination system to pre-pressurize seawater before it passes through reverse osmosis membranes. For example, in some embodiments, the pressure exchanger may be utilized to at least partially power the pumping of a fluid through a pipeline. For example, in some embodiments, the pressure exchanger may be employed to store and/or generate power in a fluid displacement energy storage system.

In some embodiments, high-pressure flow produced may be employed to power subsea turbines or turbochargers, which in some configurations may comprise pressure exchangers. In some embodiments, for example, a turbine may be configured to utilize the kinetic and/or potential energy of the pressurized flow to power subsea equipment or generate electricity.

In some embodiments, a turbocharger may use the high-pressure flow to enhance the performance of subsea compressors, pumps, or other fluid-processing equipment. For example, the turbocharger may boost the output pressure of a secondary pump, for example, which may enable long-distance fluid transport or the operation of high-pressure processing systems. The use of high-pressure, low-volume flows may reduce the size of the turbocharger assembly.

Subsea Desalination

In some embodiments, the system may support or facilitate desalination processes, such as subsea desalination processes. In some embodiments, a high-pressure output may be directed to reverse osmosis membranes located within a subsea desalination unit, or offshore, or onshore, or any combination thereof.

In some embodiments, the high-pressure, low-volume flow produced by the system may provide several advantages for subsea power generation and co-located power conversion. For example, by concentrating the energy of a large volumetric flow into a compact stream, the hydraulic ram pump may enable the use of smaller, more efficient power generation and processing components.

In some embodiments, the proportionally compact scale of subsea turbines and/or pressure exchangers, may allow for modular deployment. Additionally, the high-pressure flow may proportionally improve efficiency and/or reduce energy losses and operational costs.

In some embodiments, a turbine may be a reaction turbine, such as a Francis or Pelton turbine. In some embodiments, a turbine may incorporate axial or radial flow designs.

In some embodiments, a power generation system may include flow-regulating devices or pressure dampers to smooth out any pulsations inherent in the hydraulic ram pump's operation. In some embodiments, a generator may be sealed within a pressure-resistant housing to, for example, protect it from the surrounding environment.

In some embodiments, electricity generated by the system may be transmitted to a surface facility, or an offshore platform, or directly into a subsea power application or transmission cable or grid, or any combination thereof. In some embodiments, the power generation system may include transformers or converters to adjust the voltage or current characteristics of the output electricity to, for example, meet specific grid requirements or application requirements or to optimize transmission efficiency. In some embodiments, the system may integrate with energy storage solutions, such as subsea batteries, or subsea fluid displacement energy storage, or flywheels.

Some embodiments may also support hybrid power generation applications. For example, some embodiments may be deployed alongside wave energy converters, or solar power systems, or wind turbines to create an integrated renewable energy solution.

In some embodiments, the scalability and modularity of the system may allow for the deployment of multiple units in parallel, which may enable large-scale power generation installations. In some embodiments, installations may harness energy from extensive tidal or ocean current flows, providing a renewable energy source capable of powering coastal or offshore operations, remote facilities, or even grid-scale applications.

Pressure Exchanging

In some embodiments, the subsea hydraulic ram pump system may be configured to integrate with pressure exchangers, such as PX pressure exchangers, turbocharger pressure exchangers, or other types of energy recovery devices. These configurations may utilize the high-pressure, low-volume output of the hydraulic ram pump to efficiently transfer energy to secondary fluid streams, which may enable, for example, energy recovery, or fluid processing, or pressure storage, or pressure boosting applications, which may include, but is not limited to, in subsea or remote environments.

PX Pressure Exchangers

In some embodiments, the high-pressure output may drive a PX pressure exchanger, which may transfer the pressure energy from the pumped stream to a secondary fluid, such as seawater, brine, or process fluids. In some embodiments, a PX pressure exchanger may use a direct-contact approach where the high-pressure fluid and the low-pressure fluid alternately occupy chambers or ducts within the device, allowing efficient energy transfer with minimal mixing or energy loss. This mechanism may enable the PX pressure exchanger to achieve energy transfer efficiencies exceeding 90%, depending on operating conditions.

In some embodiments, the PX pressure exchanger may be deployed in subsea desalination systems to pre-pressurize seawater, for example, before transfer into reverse osmosis membranes and/or may reduce the power demand or energy cost in a desalination process.

Turbocharger Pressure Exchangers

In some embodiments, the high-pressure output may be employed to drive a turbocharger pressure exchanger.

Other Pressure Exchangers

In some embodiments, the high-pressure output flow from the hydraulic ram pump may also be utilized in other types of pressure exchangers, including but not limited to hydraulic turbines, axial-flow pressure amplifiers, or multi-stage energy recovery devices.

Other downstream applications may include, but are not limited to, one or more or any combination of the following: boosting the pressure of cooling water for subsea equipment, or recovering energy from waste streams, or enabling long-distance fluid transport in pipelines.

In some embodiments, the pressure exchanger may operate in conjunction with additional components, such as pulsation dampers or flow regulators, to, for example, ensure consistent performance and mitigate fluctuations in the hydraulic ram pump's output. The exchanger may also be equipped with monitoring systems, such as pressure and flow sensors, to optimize operation and facilitate predictive maintenance.

In some embodiments, multiple pressure exchangers may be deployed in parallel or series, supporting large-scale operations or multi-stage energy recovery processes.

In some embodiments, pressure exchangers may be employed in the system to transfer the hydraulic energy from the high-pressure output of the system to secondary fluids, which may include seawater, brine, hydrocarbons, or other process fluids. In some embodiments, pressure exchangers may achieve energy transfer efficiencies exceeding 90%.

Description of Power Transmission from the System

In some embodiments, the system may include provisions for the efficient transmission of power generated by integrated hydroelectric generators or other energy conversion devices. Some embodiments may convert the hydraulic energy of the high-pressure flow into mechanical or electrical energy, which may then be transmitted to remote locations for use in various applications. In some embodiments, power transmission from the system may be achieved using electrical, hydraulic, or mechanical methods, and/or specific approaches may be selected based on operational requirements, environmental considerations, or the distance to the intended end-use location.

In some embodiments involving hydroelectric generators, the mechanical rotational energy produced by the turbine may be converted into electrical energy using an integrated generator. The resulting electricity may be transmitted through subsea power cables, which may extend to a surface platform, land-based facility, or offshore grid connection point. In some embodiments, power cables may include insulation and armoring to protect against physical damage, corrosion, and electrical interference in the subsea environment. In some embodiments, step-up transformers may be incorporated into the system to increase the voltage of the generated electricity and/or reducing transmission losses over long distances.

In some embodiments, such as for localized energy needs, the hydropower generator and/or turbine or hydroelectric generator may supply electricity, or mechanical power, or hydraulic power, or other power directly to subsea equipment, such as pumps, sensors, or processing units. In some embodiments, localized power generation and/or transmission may eliminate or reduce the need for surface-level infrastructure, and/or simplify system design and/or reducing overall cost. In some embodiments, the turbine or generator may include modular or replaceable components and/or may facilitate maintenance and upgrades in situ.

In some embodiments, the power transmission system may also utilize hydraulic or mechanical methods to transfer energy. For example, power or the rotational power produced by a turbine may be transmitted via drive shafts or gear assemblies to adjacent equipment, such as subsea pumps or compressors. In some embodiments, a direct mechanical transmission approach may minimize energy conversion losses and enhance overall system efficiency. In some embodiments, the high-pressure flow generated by the hydraulic ram pump may itself serve as a medium for hydraulic power transmission, and/or which may enable the operation of remote hydraulic actuators, turbochargers, or fluid transport systems.

In some embodiments, the transmission system may further incorporate monitoring and control features to ensure reliable operation and optimize performance. Sensors may be embedded within power cables, conduits, or mechanical components to measure parameters such as voltage, current, pressure, or rotational speed. Data may be transmitted to a surface platform or control station, enabling real-time diagnostics and predictive maintenance. Additionally, the system may include safety features, such as circuit breakers, pressure relief valves, or mechanical clutches, to protect against overloading or equipment failure.

In some embodiments, the transmitted power may be directed to subsea batteries, flywheels, or fluid displacement energy storage, or gravitational energy storage, or other storage devices. These storage systems may provide a buffer against fluctuations in power generation and/or ensure a stable energy supply for downstream applications. Stored energy may also be used during periods of low hydraulic flow, which may enhance the system's reliability and flexibility.

Power Generation Using a Reservoir and/or Higher Elevation Reservoir and/or Consolidation of Fluid Streams In some embodiments, the system may be configured to transfer its high-pressure water output to a reservoir located at a higher elevation. A reservoir may serve as an energy storage or intermediate transfer point, from which water is subsequently released to a lower elevation where a hydropower generation system, such as a hydroelectric turbine, may generate electricity. Some embodiments may utilize the potential energy created by elevating the water. In some embodiments, the reservoir and/or associated infrastructure may be designed to integrate with existing systems, complement geographical features, or serve as purpose-built energy facilities.

In some embodiments, the high-pressure water output of the hydraulic ram pump may be directed through conduits or pipelines to a reservoir positioned on a tower, floating vessel, water-based structure, or land-based location. The reservoir may be constructed from materials and designs suitable for the intended environment, such as reinforced concrete for land-based installations or corrosion-resistant composites for floating or offshore reservoirs. The reservoir may also include features to manage flow and maintain water quality, such as sediment traps, filtration systems, or anti-fouling coatings.

In some embodiments, the higher elevation reservoir may be integrated with or leverage existing infrastructure, such as offshore wind turbine towers, oil rigs, FPSOs (Floating Production Storage and Offloading vessels), floating watercraft, coastal regions, or islands, or bridges. For example, an offshore wind turbine tower may support a reservoir, for example, near its upper structure, enabling the combined use of renewable energy sources in a hybrid system. Similarly, an oil rig or FPSO may utilize its existing infrastructure to house or support a water reservoir, potentially providing additional functionality to these platforms.

In some embodiments, the stored water in the higher elevation reservoir may be released through controlled outlets, such as valves or sluices, to flow to a lower elevation where a hydroelectric turbine may convert the potential energy of the water into mechanical energy, and/or subsequently generating electricity. In some embodiments, the turbine may be located at the base of the tower, near sea level for offshore applications, or at a coastal or inland site, depending on the reservoir's location and intended application. In some embodiments, the turbine and associated generator may be designed to optimize efficiency for the specific flow and pressure conditions provided by the reservoir.

In some embodiments, multiple hydraulic ram pump units may transfer high-pressure water to a single reservoir, allowing streams from several sources to combine at a meeting point or intersection point. In some embodiments, aggregation of water may increase the capacity of the system and/or reservoir, and/or support larger-scale hydropower generation systems and/or improving overall energy efficiency. In some embodiments, a single reservoir approach may simplify infrastructure requirements by consolidating energy transfer and storage into a centralized location.

In some embodiments, a reservoir may also serve additional purposes, such as buffering flow variability from the system, enabling peak demand energy supply, or providing water for ancillary applications such as cooling, desalination, or irrigation. In some embodiments, the reservoir may be part of a hybrid energy system, integrating hydropower generation with other renewable energy sources, such as wind or solar power, to create a resilient and sustainable energy solution.

Flow Concentrators and Flow Diffusers

In some embodiments, the system may incorporate flow concentrators and flow diffusers to enhance the efficiency and functionality of the system and/or optimizing the characteristics of the water flow entering or exiting the hydraulic ram pump. In some embodiments, flow concentrators may be employed to increase the velocity and kinetic energy of the incoming water stream, while flow diffusers may be used to reduce turbulence and control the discharge of water, which may improve the system's overall performance and compatibility with downstream applications.

Flow Concentrators

In some embodiments, flow concentrators may be designed to increase the velocity of water entering the hydraulic ram pump system by narrowing or channeling the cross-sectional area of the incoming flow. In some embodiments, flow concentrators may be constructed as funnel-like structures with tapered geometries, wherein the upstream inlet may have a larger diameter than the downstream outlet. In some embodiments, as water flows through the concentrator, the reduction in cross-sectional area may increase its velocity while conserving its mass flow rate, thereby enhancing the kinetic energy of the water stream.

In some embodiments, flow concentrators may be positioned at the intake of the drive pipe to ensure that the water entering the system has sufficient velocity to generate the desired pressure surges during operation. In some embodiments, flow concentrators may include features such as flow-stabilizing vanes or guide plates to reduce turbulence and ensure a smooth transition of water into the drive pipe.

In some embodiments, flow concentrators may be constructed from materials suitable for the operational environment, including corrosion-resistant alloys, reinforced polymers, or composite materials. In some embodiments, the shape and dimensions of the flow concentrator may be customized to match the specific flow characteristics of the site, with consideration given to factors such as water depth, velocity, and sediment content. In some embodiments, multiple flow concentrators may be deployed in parallel to accommodate larger water volumes or to feed multiple hydraulic ram pump units.

Flow Diffusers

In some embodiments, flow diffusers may be employed at the discharge end of the hydraulic ram pump system to reduce turbulence and/or control the expansion of the water flow as it exits the system. A flow diffuser may be constructed as an expanding conduit, wherein the cross-sectional area gradually increases from the inlet to the outlet. In some embodiments, an expansion may allow the velocity of the exiting water to decrease while maintaining smooth and controlled flow characteristics.

In some embodiments, the use of a flow diffuser may provide several benefits, including minimizing backflow or turbulence that could interfere with the operation of the hydraulic ram pump. In some embodiments, the diffuser may reduce localized erosion or scouring at the point of discharge, such as in sediment-rich environments or areas with soft seabed conditions. In some embodiments, the diffuser may also serve to distribute the discharged water more evenly, which may, for example, mitigate environmental impact and preserving marine ecosystems.

In some embodiments, flow diffusers may include optional features to enhance their functionality, such as sediment traps to prevent the accumulation of debris or internal baffles to further smooth the water flow. In some embodiments, a diffuser may also be integrated with energy recovery devices, such as pressure exchangers or turbines, to, for example, capture any residual energy in the discharged water for, for example, supplemental power generation or other uses.

In some embodiments, similar to flow concentrators, flow diffusers may be constructed from durable materials designed to withstand the pressures and corrosive conditions of the underwater environment. In some embodiments, the dimensions and geometry of the diffuser may be tailored to the specific discharge requirements of the system, and/or may take into account factors such as flow rate, pressure, and environmental conditions.

Applications and Integration

In some embodiments, flow concentrators and diffusers may be enable the system to adapt to a wide range of applications and site conditions. In some embodiments, the flow concentrators may enable the system to harness energy from lower-velocity or dispersed water flows, and/or expand the potential deployment locations for the technology.

In some embodiments, flow concentrators may also be employed in configurations involving multiple units, wherein, for example, the concentrators and diffusers may manage and optimize the combined water streams for energy generation, fluid processing, or storage applications. In some embodiments, modular design and adaptability may allow flow concentrators or diffusers to be integrated into both standalone and hybrid energy systems.

In some embodiments, a flow concentrator may comprise a funnel-shaped structure with an inlet of larger diameter and an outlet of smaller diameter, where the reduction in cross-sectional area may result in an acceleration of the water flow while maintaining the volumetric flow rate. In some embodiments, the geometry of the concentrator may be tailored to site-specific conditions, such as the natural flow velocity, vector or direction, or water depth, or sediment content. In some embodiments, the concentrator may include internal flow-stabilizing vanes or baffles to minimize turbulence and ensure a laminar flow profile as water enters the drive pipe.

In some embodiments, flow concentrators may be deployed in a variety of configurations, depending on the scale and requirements of the hydraulic ram pump system. For example, in installations with multiple pump units, individual concentrators may feed separate drive pipes, or a single large concentrator may channel flow to multiple pumps. In some embodiments, a modular design of the concentrator design may facilitate easy scaling and integration with other components of the system.

In some embodiments, a flow concentrator may include additional features to enhance its functionality. In some embodiments, for example, sediment traps may be integrated near the base of the concentrator to capture and prevent debris from entering the drive pipe, which may reduce the risk of clogs or wear on the pump components. In some embodiments, anti-fouling coatings or smooth surface finishes may be applied to internal surfaces to resist the buildup of biofouling or other obstructions, ensuring consistent performance over time. In some embodiments, adjustable or modular concentrator components may allow the system to adapt to seasonal variations in flow conditions or changes in the operational environment.

In some embodiments, the system may incorporate flow diffusers to control and optimize the discharge characteristics of water exiting the system. In some embodiments, a flow diffuser may be designed to gradually expand the cross-sectional area of the flow path, reducing the velocity of the water and/or may mitigate turbulence, reduce back-pressure effects on the hydraulic ram pump, and minimize the environmental impact of the discharge, such as in sediment-rich or ecologically sensitive areas.

In some embodiments, a flow diffuser may be constructed as an expanding conduit, with an inlet diameter smaller than its outlet diameter, enabling a gradual deceleration and distribution of the exiting water flow. The geometry of the diffuser may be tailored to the specific requirements of the system, such as the flow rate, pressure conditions, and deployment environment. In some embodiments, internal baffles or flow-stabilizing vanes may be included within the diffuser to further reduce turbulence and enhance the uniformity of the discharge flow.

In some embodiments, the material composition of the flow diffuser may be selected to ensure durability and resistance to environmental factors, including corrosion, biofouling, and abrasion from sediment. Materials such as marine-grade stainless steel, advanced composites, or high-performance polymers may be used, depending on the operating environment and anticipated service life. Surface treatments, such as anti-fouling coatings or hydrophobic finishes, may be applied to the internal surfaces of the diffuser to resist marine growth or sediment buildup.

In some embodiments, the flow diffuser may serve additional functions beyond controlling the water discharge. For example, in sediment-rich environments, the diffuser may include integrated sediment traps or flushing channels to manage debris and prevent it from accumulating within the system. In other embodiments, the diffuser may incorporate energy recovery devices, such as small turbines or pressure exchangers, to capture residual energy from the exiting water for supplemental power generation or other applications.

In some embodiments, the flow diffuser may be modular, allowing for easy installation, replacement, or adaptation to changing operational requirements. For instance, adjustable or interchangeable diffuser components may enable the system to accommodate variations in flow conditions, such as seasonal changes in water velocity or volume. Additionally, diffusers may be used in conjunction with flow concentrators to create a balanced system that optimizes both the intake and discharge characteristics of the system.

Some embodiments may be configured to operate efficiently in environments where water flow directions, velocities, and vectors are variable or multidirectional and/or may allow the system to maintain optimal performance across a range of conditions, including tidal flows, ocean currents, and riverine environments, where water movements may change due to natural or artificial influences. In some embodiments, the system may include structural and sensor-based enhancements to adjust to and monitor these variable flow conditions.

Adaptation to Variable Water Flow Directions

In some embodiments, the system may include an intake assembly designed to capture and direct water from flows of varying directions into the drive pipe. In some embodiments, this intake assembly or the integrated system may incorporate a rotatable or pivotable structure, such as a gimballed intake funnel or a spherical inlet, allowing the intake to align dynamically with the predominant flow direction. In some embodiments, components may be passively actuated by the force of the flow or actively controlled using motorized or hydraulic mechanisms, and/or actively adjusted. In some embodiments, alignment capability may ensure or enable water enter the system at an at least partially optimal angle, which may reduce turbulence and/or maximize the energy efficiency.

In some embodiments, to handle flow conditions with complex or highly variable vectors, the system may employ a multi-directional intake array comprising multiple inlet pathways arranged around a central collection point. In some embodiments, each pathway may be equipped with flow concentrators to independently capture and accelerate water from specific directions. In some embodiments, the system may dynamically open or close these pathways based on real-time flow conditions, ensuring efficient operation regardless of the primary flow direction.

Monitoring and Adjustment of Flow Velocities and Vectors

In some embodiments, the system may include integrated sensors to monitor water flow velocities and vectors at or near the intake assembly. In some embodiments, sensors may utilize technologies such as Doppler-based flowmeters, acoustic current profilers, or mechanical flow vanes to measure parameters including flow speed, direction, and turbulence. Data may be transmitted to an onboard or remote control system for analysis.

The control system may process this data in real-time to adjust system components, such as the intake angle, flow concentrator configurations, or valve timing, to optimize performance. For example, in scenarios where the flow velocity decreases, the control system may redirect more water into flow concentrators to maintain pressure amplification. For example, in high-velocity conditions, the system may reduce the intake aperture to prevent overloading or inefficiencies.

Dynamic Flow Vector Management

In some embodiments, to adapt to changing flow vectors, the system may include baffles, vanes, or guide plates installed upstream of the intake assembly. In some embodiments, components may redirect water flow into the desired orientation for entry into the drive pipe. In some embodiments, these guide elements may be actively adjustable using mechanical or hydraulic actuators controlled by flow monitoring sensors. In some embodiments, a capability may allow the system to adjust to multi-vector currents, such as those found in tidal environments where flow direction reverses periodically.

In some embodiments, for environments with highly erratic or chaotic flow patterns, the system may incorporate flow-stabilizing structures, such as submerged barriers or channeling walls, to reduce turbulence and create a more predictable flow profile. Said structures may be fixed or dynamically adjustable based on environmental conditions.

Advanced Flow Monitoring and Predictive Analytics

In some embodiments, the system may include advanced monitoring capabilities, such as multi-axis flow sensors and machine learning algorithms, to, for example, predict changes in flow conditions and preemptively adjust system settings. For example, the system may analyze historical flow data to predict the timing and magnitude of tidal reversals or storm-induced surges. In some embodiments, based on these predictions, the control system may optimize the positioning of the intake assembly, adjust valve timings, or even temporarily suspend operations to protect system components.

In some embodiments, the monitoring subsystem may also include redundancy features, such as multiple sensors distributed across the intake area, to ensure continuous data collection even if one or more sensors are obstructed or malfunctioning. Sensor data may be stored locally or transmitted to remote facilities for long-term analysis and system optimization.

Adaptation for Specific Environments

For example, in tidal environments, the system may be configured with bidirectional intakes and drive pipes, allowing it to operate efficiently during both incoming and outgoing tidal flows. For example, in ocean current applications, the system may include components to compensate for vertical or diagonal flow vectors, such as adjustable intake angles or multi-axis flow concentrators. For example, in riverine environments with varying flow speeds, the system may dynamically adjust its intake size and orientation to maintain consistent pressure amplification.

Some embodiments may be applicable to a broad range of industrial, energy, and environmental applications, which may include, but are not limited to, one or more or any combination of the following:

- Renewable power generation, such as electric power generation
- Water desalination processes
- Industrial fluid processing, such as the injection or transfer of chemicals
- Environmental management systems, including aquifer recharge and brine disposal/

EXAMPLE DETAILED FIGURE DESCRIPTIONS

FIG. 1 and FIG. 2

Example FIG. 1 and FIG. 2 Summary

FIGS. 1 and 2 may show an embodiment comprising a subsea ram pump system generating power from open water currents, wherein the power turbine and/or generator may fluidly connected to the high pressure output, and/or the turbine and/or generator may be located subsea.

FIG. 1 may show the system at a state wherein water is flowing through the drive pipe and the waste valve or first valve, with 'waste flow' exiting the system through the waste valve or first valve. The first valve may be open and the second valve may be closed.

FIG. 2 may show the system at a state wherein water is blocked in the drive pipe or pump chamber due to, for example, the closure of the waste valve or first valve, with a portion of high pressure output flow water exiting the pump chamber through the delivery valve or second valve into the subsea power turbine and/or generator, generating power. The first valve may be closed and the second valve may be open.

Example FIG. 1 and FIG. 2 Step-by-Step Description

Water from an open water current flows through a drive pipe and pump chamber, exiting through the first valve or waste valve. The first valve is at least partially open and the second valve is at least partially closed.

The first valve or waste valve is at least partially closed, causing a pressure surge in the pump chamber due to the water hammer effect. The second valve opens or becomes at least partially open, allowing the transfer of at least a portion of the high pressure water to exit the pump chamber as a high pressure water output.

The high pressure water output is transferred to a turbine and/or generator, generating power, such as electricity.

Example FIG. 1 and FIG. 2 Key

Example FIG. 1 and FIG. 2 Key

| Label | Example Description |
|---|---|
| 1 | Pump chamber and/or drive pipe assembly or unit. May comprise pump chamber, or drive pipe, or flow concentrator, or flow diffuser, or sensors, or monitoring systems, or valves, ports, or any combination thereof. |
| 2 or V2 | Second valve or delivery valve or high pressure output valve. |
| 3 or V1 | First valve or waste valve or waste flow valve. |
| 4 or G | Turbine and/or generator, which may convert, or transform, or generate power, such as electrical, or mechanical, or hydraulic, or pneumatic, or pressure, or fluid displacement, or electricity, or flow, or any combination thereof power or useful work. |
| 5 | Subsea power cable or submarine power cable. |
| 6 | Floating vessel |
| 7 | Subsea pipe or riser or conduit which may transfer the high pressure output flow from the second valve or delivery valve or port to the reservoir, or turbine, or generator, or any combination thereof, which may be located, if desired, in a more accessible location, such as on a vessel, or above the water, or on land, or at a different depth, or in a different location, or any combination thereof. |
| 8 | A tower or platform or wind turbine or bridge or offshore structure or marine structure or aquatic platform or aquatic structure. |
| 9 | Higher elevation reservoir or high elevation reservoir or high elevation tank or elevated reservoir or elevated tank. |
| 10 | Pipe or riser or conduit which may transfer the high pressure output flow from the second valve or delivery valve or port to the reservoir, or turbine, or generator, or any combination thereof, which may be located, if desired, in a more accessible location, such as on a vessel, or above the water, or on land, or on a tower, or at a different depth, or at a different elevation, or in a different location, or any combination thereof. |
| Current | Water flow or moving water. Water moving with a velocity. In some embodiments, may comprise open water moving with a velocity and/or vector. The arrow associated with the current in the figure may be showing an example vector or direction of a current. |
| Ocean | A body of water which the system may be situated, or deployed, or |

-continued

| Example FIG. 1 and FIG. 2 Key | |
|---|---|
| Label | Example Description |
| | installed. May include, but is not limited to, one or more or any combination of the following: tidal streams, or open ocean, or bodies of water, or moving bodies of water, or estuaries, or aquatic environments, or marine environments, or other bodies of water, or water bodies described herein, or other bodies of water in the art, or any combination thereof. |
| Seabed | Land or other surface or other solid or semisolid surface which may be located beneath or within a body of water or may be adjacent to or fluidly connected to a body of water. |

FIG. 3 and FIG. 4

Example FIG. 3 and FIG. 4 Summary

FIGS. 3 and 4 may show an embodiment comprising a subsea ram pump system generating power from open water currents, wherein the power turbine and/or generator may be fluidly connected to the high pressure output using a riser or pipe, and/or the turbine and/or generator may be located on a floating platform or floating vessel.

FIG. 3 may show the system at a state wherein water is flowing through the drive pipe and the waste valve or first valve, with 'waste flow' exiting the system through the waste valve or first valve. The first valve may be open and the second valve may be closed.

FIG. 4 may show the system at a state wherein water is blocked in the drive pipe or pump chamber due to, for example, the closure of the waste valve or first valve, with a portion of high pressure output flow water exiting the pump chamber through the delivery valve or second valve into the subsea power turbine and/or generator, generating power. The first valve may be closed and the second valve may be open.

Example FIG. 3 and FIG. 4 Step-by-Step Description

Water from an open water current flows through a drive pipe and pump chamber, exiting through the first valve or waste valve. The first valve is at least partially open and the second valve is at least partially closed.

The first valve or waste valve is at least partially closed, causing a pressure surge in the pump chamber due to the water hammer effect. The second valve opens or becomes at least partially open, allowing the transfer of at least a portion of the high pressure water to exit the pump chamber as a high pressure water output.

The high pressure water output is transferred through a pipe or conduit or riser to a turbine and/or generator, generating power, such as electricity.

Example FIG. 3 and FIG. 4 Key

Reference FIG. 1 and FIG. 2 Key

FIG. 5 and FIG. 6

Example FIG. 5 and FIG. 6 Summary

FIGS. 5 and 6 may show an embodiment comprising a subsea ram pump system generating power from open water currents, wherein the high pressure fluid output may be transferred to a higher elevation storage reservoir or location, and/or power may be stored and/or generated. In some embodiments, power may be generated by allowing water to flow from the higher elevation reservoir, through a pipe or conduit, into a turbine or generator, which may be located at a relatively lower elevation, generating power. Some embodiments may enable continuous and/or smooth power generation and/or power delivery.

FIG. 5 may show the system at a state wherein water is flowing through the drive pipe and the waste valve or first valve, with 'waste flow' exiting the system through the waste valve or first valve. The first valve may be open and the second valve may be closed.

FIG. 6 may show the system at a state wherein water is blocked in the drive pipe or pump chamber due to, for example, the closure of the waste valve or first valve, with a portion of high pressure output flow water exiting the pump chamber through the delivery valve or second valve into the subsea power turbine and/or generator, generating power. The first valve may be closed and the second valve may be open.

Example FIG. 5 and FIG. 6 Step-by-Step Description

Water from an open water current flows through a drive pipe and pump chamber, exiting through the first valve or waste valve. The first valve is at least partially open and the second valve is at least partially closed.

The first valve or waste valve is at least partially closed, causing a pressure surge in the pump chamber due to the water hammer effect. The second valve opens or becomes at least partially open, allowing the transfer of at least a portion of the high pressure water to exit the pump chamber as a high pressure water output.

The high pressure water output is transferred through a pipe or conduit or riser to a higher elevation reservoir, or tank, or location, which may store the power or energy as potential energy. Power may be generated by allowing water to flow from the higher elevation reservoir, or tank, or location into a pipe or conduit and through a turbine and/or generator, generating power, such as electricity.

Example FIG. 5 and FIG. 6 Key

Reference FIG. 1 and FIG. 2 Key

Example Notes

In some embodiments, the drive pipe length, or flow concentrator length, or flow diffuser length, or any combination thereof, may be less than, or greater than, or equal to one or more or any combination of the following: 1 m, or 2.5 m, 5 m, or 10 m, or 15 m, or 20 m, or 25 m, or 30 m, or 35 m, or 40 m, or 45 m, or 50 m, or 55 m, or 60 m, or 65 m, or 70 m, or 75 m, or 80 m, or 85 m, or 90 m, or 95 m, or 100 m, or 105 m, or 110 m, or 115 m, or 120 m, or 125 m, or 130 m, or 135 m, or 140 m, or 145 m, or 150 m, or 155 m, or 160 m, or 165 m, or 170 m, or 175 m, or 180 m, or 185 m, or 190 m, or 195 m, or 200 m, or 205 m, or 210 m, or 215 m, or 220 m, or 225 m, or 230 m, or 235 m, or 240 m, or 245 m, or 250 m, or 255 m, or 260 m, or 265 m, or 270 m, or 275 m, or 280 m, or 285 m, or 290 m, or 295 m, or 300 m, or 305 m, or 310 m, or 315 m, or 320 m, or 325 m, or 330 m, or 335 m, or 340 m, or 345 m, or 350 m, or 355 m, or 360 m, or 365 m, or 370 m, or 375 m, or 380 m, or 385 m, or 390 m, or 395 m, or 400 m, or 405 m, or 410 m, or 415 m, or 420 m, or 425 m, or 430 m, or 435 m, or 440 m, or 445 m, or 450 m, or 455 m, or 460 m, or 465 m, or 470 m, or 475 m, or 480 m, or 485 m, or 490 m, or 495 m, or 500 m.

In some embodiments, the drive pipe diameter may be less than, or greater than, or equal to one or more or any combination of the following: 0.5 m, or 1 m, or 1.5 m, or 2 m, or 2.5 m, or 3 m, or 3.5 m, or 4 m, or 4.5 m, or 5 m, or 5.5 m, or 6 m, or 6.5 m, or 7 m, or 7.5 m, or 8 m, or 8.5 m, or 9 m, or 9.5 m, or 10 m, or 10.5 m, or 11 m, or 11.5 m, or 12 m, or 12.5 m, or 13 m, or 13.5 m, or 14 m, or 14.5 m, or 15 m, or 15.5 m, or 16 m, or 16.5 m, or 17 m, or 17.5 m, or 18 m, or 18.5 m, or 19 m, or 19.5 m, or 20 m, or 20.5 m, or 21 m, or 21.5 m, or 22 m, or 22.5 m, or 23 m, or 23.5 m, or 24 m, or 24.5 m, or 25 m, or 25.5 m, or 26 m, or 26.5 m, or 27 m, or 27.5 m, or 28 m, or 28.5 m, or 29 m, or 29.5 m, or 30 m.

In some embodiments, the flow concentrator or intake diameter may be less than, or greater than, or equal to one or more or any combination of the following: 0.5 m, or 1 m, or 1.5 m, or 2 m, or 2.5 m, or 3 m, or 3.5 m, or 4 m, or 4.5 m, or 5 m, or 5.5 m, or 6 m, or 6.5 m, or 7 m, or 7.5 m, or 8 m, or 8.5 m, or 9 m, or 9.5 m, or 10 m, or 10.5 m, or 11 m, or 11.5 m, or 12 m, or 12.5 m, or 13 m, or 13.5 m, or 14 m, or 14.5 m, or 15 m, or 15.5 m, or 16 m, or 16.5 m, or 17 m, or 17.5 m, or 18 m, or 18.5 m, or 19 m, or 19.5 m, or 20 m, or 20.5 m, or 21 m, or 21.5 m, or 22 m, or 22.5 m, or 23 m, or 23.5 m, or 24 m, or 24.5 m, or 25 m, or 25.5 m, or 26 m, or 26.5 m, or 27 m, or 27.5 m, or 28 m, or 28.5 m, or 29 m, or 29.5 m, or 30 m, 40 m, or 50 m, or 60 m, or 75 m, or 100 m.

In some embodiments, the diffuser or outflow diameter may be less than, or greater than, or equal to one or more or any combination of the following: 0.5 m, or 1 m, or 1.5 m, or 2 m, or 2.5 m, or 3 m, or 3.5 m, or 4 m, or 4.5 m, or 5 m, or 5.5 m, or 6 m, or 6.5 m, or 7 m, or 7.5 m, or 8 m, or 8.5 m, or 9 m, or 9.5 m, or 10 m, or 10.5 m, or 11 m, or 11.5 m, or 12 m, or 12.5 m, or 13 m, or 13.5 m, or 14 m, or 14.5 m, or 15 m, or 15.5 m, or 16 m, or 16.5 m, or 17 m, or 17.5 m, or 18 m, or 18.5 m, or 19 m, or 19.5 m, or 20 m, or 20.5 m, or 21 m, or 21.5 m, or 22 m, or 22.5 m, or 23 m, or 23.5 m, or 24 m, or 24.5 m, or 25 m, or 25.5 m, or 26 m, or 26.5 m, or 27 m, or 27.5 m, or 28 m, or 28.5 m, or 29 m, or 29.5 m, or 30 m, 40 m, or 50 m, or 60 m, or 75 m, or 100 m.

The ratio of the diameter or cross sectional area of the flow concentrator or intake to the drive pipe, or flow diffuser or outflow to the drive pipe, or the first valve to the second valve, or any combination thereof may be less than, or greater than, or equal to one or more or any combination of the following: 1:1, or 2:1, or 3:1, or 4:1, or 5:1, or 6:1, or 7:1, or 8:1, or 9:1, or 10:1, or 11:1, or 12:1, or 13:1, or 14:1, or 15:1, or 16:1, or 17:1, or 18:1, or 19:1, or 20:1, or 21:1, or 22:1, or 23:1, or 24:1, or 25:1, or 26:1, or 27:1, or 28:1, or 29:1, or 30:1, or 31:1, or 32:1, or 33:1, or 34:1, or 35:1, or 36:1, or 37:1, or 38:1, or 39:1, or 40:1, or 41:1, or 42:1, or 43:1, or 44:1, or 45:1, or 46:1, or 47:1, or 48:1, or 49:1, or 50:1, or 75:1, or 100:1.

The tapering angle of the flow concentrator or intake, or the tapering angle of the flow diffuser or outflow, or any combination thereof may be less than, or greater than, or equal to one or more or any combination of the following: 0.5°, or 1°, or 1.5°, or 2°, or 2.5°, or 3°, or 3.5°, or 4°, or 4.5°, or 5°, or 5.5°, or 6°, or 6.5°, or 7°, or 7.5°, or 8°, or 8.5°, or 9°, or 9.5°, or 10°, or 10.5°, or 11°, or 11.5°, or 12°, or 12.5°, or 13°, or 13.5°, or 14°, or 14.5°, or 15°, or 15.5°, or 16°, or 16.5°, or 17°, or 17.5°, or 18°, or 18.5°, or 19°, or 19.5°, or 20°, or 20.5°, or 21°, or 21.5°, or 22°, or 22.5°, or 23°, or 23.5°, or 24°, or 24.5°, or 25°, or 25.5°, or 26°, or 26.5°, or 27°, or 27.5°, or 28°, or 28.5°, or 29°, or 29.5°, or 30°, or 30.5°, or 31°, or 31.5°, or 32°, or 32.5°, or 33°, or 33.5°, or 34°, or 34.5°, or 35°, or 35.5°, or 36°, or 36.5°, or 37°, or 37.5°, or 38°, or 38.5°, or 39°, or 39.5°, or 40°, or 40.5°, or 41°, or 41.5°, or 42°, or 42.5°, or 43°, or 43.5°, or 44°, or 44.5°, or 45°, or 45.5°, or 50°, or 55°, or 60°, or 70°, or 80°, or 90°.

Pressures may be less than, or greater than, or equal to one or more or any combination of the following: 0.25 bar, or 0.5 bar, or 0.75 bar, or 1 bar, or 1.25 bar, or 1.5 bar, or 1.75 bar, or 2 bar, or 2.25 bar, or 2.5 bar, or 2.75 bar, or 3 bar, or 3.25 bar, or 3.5 bar, or 3.75 bar, or 4 bar, or 4.25 bar, or 4.5 bar, or 4.75 bar, or 5 bar, or 5.25 bar, or 5.5 bar, or 5.75 bar, or 6 bar, or 6.25 bar, or 6.5 bar, or 6.75 bar, or 7 bar, or 7.25 bar, or 7.5 bar, or 7.75 bar, or 8 bar, or 8.25 bar, or 8.5 bar, or 8.75 bar, or 9 bar, or 9.25 bar, or 9.5 bar, or 9.75 bar, or 10 bar, or 15 bar, or 20 bar, or 25 bar, or 30 bar, or 35 bar, or 40 bar, or 45 bar, or 50 bar, or 55 bar, or 60 bar, or 65 bar, or 70 bar, or 75 bar, or 80 bar, or 85 bar, or 90 bar, or 95 bar, or 100 bar, or 150 bar, or 200 bar, or 250 bar, or 300 bar, or 350 bar, or 400 bar, or 450 bar, or 500 bar, or 1,000 bar.

The ratio of waste flow to delivery flow may be less than, or greater than, or equal to one or more or any combination of the following: 1:1, or 2:1, or 3:1, or 4:1, or 5:1, or 6:1, or 7:1, or 8:1, or 9:1, or 10:1, or 11:1, or 12:1, or 13:1, or 14:1, or 15:1, or 16:1, or 17:1, or 18:1, or 19:1, or 20:1, or 21:1, or 22:1, or 23:1, or 24:1, or 25:1, or 26:1, or 27:1, or 28:1, or 29:1, or 30:1, or 31:1, or 32:1, or 33:1, or 34:1, or 35:1, or 36:1, or 37:1, or 38:1, or 39:1, or 40:1, or 41:1, or 42:1, or 43:1, or 44:1, or 45:1, or 46:1, or 47:1, or 48:1, or 49:1, or 50:1, or 75:1, or 100:1.

Flow velocities may be less than, or greater than, or equal to one or more or any combination of the following: 0.1 m/s, or 0.25 m/s, or 0.5 m/s, or 0.75 m/s, or 1 m/s, or 1.25 m/s, or 1.5 m/s, or 1.75 m/s, or 2 m/s, or 2.25 m/s, or 2.5 m/s, or 2.75 m/s, or 3 m/s, or 3.25 m/s, or 3.5 m/s, or 3.75 m/s, or 4 m/s, or 4.25 m/s, or 4.5 m/s, or 4.75 m/s, or 5 m/s, or 5.25 m/s, or 5.5 m/s, or 5.75 m/s, or 6 m/s, or 6.25 m/s, or 6.5 m/s, or 6.75 m/s, or 7 m/s, or 7.25 m/s, or 7.5 m/s, or 7.75 m/s, or 8 m/s, or 8.25 m/s, or 8.5 m/s, or 8.75 m/s, or 9 m/s, or 9.25 m/s, or 9.5 m/s, or 9.75 m/s, or 10 m/s, or 15 m/s, or 20 m/s, or 25 m/s, or 30 m/s, or 35 m/s, or 40 m/s, or 45 m/s, or 50 m/s, or 55 m/s, or 60 m/s, or 65 m/s, or 70 m/s, or 75 m/s, or 80 m/s, or 85 m/s, or 90 m/s, or 95 m/s, or 100 m/s.

Volumetric flow rates may be less than, or greater than, or equal to one or more or any combination of the following: 0.25 $m^3$/min, or 0.5 $m^3$/min, or 0.75 $m^3$/min, or 1 $m^3$/min, or 1.25 $m^3$/min, or 1.5 $m^3$/min, or 1.75 $m^3$/min, or 2 $m^3$/min, or 2.25 $m^3$/min, or 2.5 $m^3$/min, or 2.75 $m^3$/min, or 3 $m^3$/min, or 3.25 $m^3$/min, or 3.5 $m^3$/min, or 3.75 $m^3$/min, or 4 $m^3$/min, or 4.25 $m^3$/min, or 4.5 $m^3$/min, or 4.75 $m^3$/min, or 5 $m^3$/min, or 5.25 $m^3$/min, or 5.5 $m^3$/min, or 5.75 $m^3$/min, or 6 $m^3$/min, or 6.25 $m^3$/min, or 6.5 $m^3$/min, or 6.75 $m^3$/min, or 7 $m^3$/min, or 7.25 $m^3$/min, or 7.5 $m^3$/min, or 7.75 $m^3$/min, or 8 $m^3$/min, or 8.25 $m^3$/min, or 8.5 $m^3$/min, or 8.75 $m^3$/min, or 9 $m^3$/min, or 9.25 $m^3$/min, or 9.5 $m^3$/min, or 9.75 $m^3$/min, or 10 $m^3$/min, or 15 $m^3$/min, or 20 $m^3$/min, or 25 $m^3$/min, or 30 $m^3$/min, or 35 $m^3$/min, or 40 $m^3$/min, or 45 $m^3$/min, or 50 $m^3$/min, or 55 $m^3$/min, or 60 $m^3$/min, or 65 $m^3$/min, or 70 $m^3$/min, or 75 $m^3$/min, or 80 $m^3$/min, or 85 $m^3$/min, or 90 $m^3$/min, or 95 $m^3$/min, or 100 $m^3$/min, 100 $m^3$/min, or 600 $m^3$/min, or 1,100 $m^3$/min, or 1,600 $m^3$/min, or 2,100 $m^3$/min, or 2,600 $m^3$/min, or 3,100 $m^3$/min, or 3,600 $m^3$/min, or 4,100 $m^3$/min, or 4,600 $m^3$/min, or 5,100 $m^3$/min, or 5,600 $m^3$/min, or 6,100 $m^3$/min, or 6,600 $m^3$/min, or 7,100 $m^3$/min, or 7,600 $m^3$/min, or 8,100 $m^3$/min, or 8,600 $m^3$/min, or 9,100 $m^3$/min, or 9,600 $m^3$/min, or 10,100 $m^3$/min, or 50,000 $m^3$/min, or 100,000 $m^3$/min, or 1,000,000 $m^3$/min, or 10,000,000 $m^3$/min.

Elevations, or Water depths, or any combination thereof may be less than, or greater than, or equal to one or more or any combination of the following: 0.5 m, or 1 m, or 1.5 m, or 2 m, or 2.5 m, or 3 m, or 3.5 m, or 4 m, or 4.5 m, or 5 m, or 5.5 m, or 6 m, or 6.5 m, or 7 m, or 7.5 m, or 8 m, or 8.5 m, or 9 m, or 9.5 m, or 10 m, or 15 m, or 20 m, or 25 m, or 30 m, or 35 m, or 40 m, or 45 m, or 50 m, or 55 m, or 60 m, or 65 m, or 70 m, or 75 m, or 80 m, or 85 m, or 90 m, or 95 m, or 100 m, or 150 m, or 200 m, or 250 m, or 300 m, or 350 m, or 400 m, or 450 m, or 500 m, or 550 m, or 600 m, or 650 m, or 700 m, or 750 m, or 800 m, or 850 m, or 900 m, or 950 m, or 1000 m, or 1250 m, or 1500 m, or 1750 m, or 2000 m, or 2250 m, or 2500 m, or 2750 m, or 3000 m, or 3250 m, or 3500 m, or 3750 m, or 4000 m, or 4250 m, or 4500 m, or 4750 m, or 5000 m, or 5250 m, or 5500 m, or 5750 m, or 6000 m, or 6250 m, or 6500 m, or 6750 m, or 7000 m, or 7250 m, or 7500 m, or 7750 m, or 8000 m, or 8250 m, or 8500 m, or 8750 m, or 9000 m, or 9250 m, or 9500 m, or 9750 m, or 10000 m.

Frequencies, or periods of valve closures+openings, or cycle time for valve closures+openings, or any combination thereof may be less than, or greater than, or equal to one or more or any combination of the following: 0.5 second, or 1 s, or 1.5 s, or 2 s, or 2.5 s, or 3 s, or 3.5 s, or 4 s, or 4.5 s, or 5 s, or 5.5 s, or 6 s, or 6.5 s, or 7 s, or 7.5 s, or 8 s, or 8.5 s, or 9 s, or 9.5 s, or 10 s, or 10.5 s, or 11 s, or 11.5 s, or 12 s, or 12.5 s, or 13 s, or 13.5 s, or 14 s, or 14.5 s, or 15 s, or 15.5 s, or 16 s, or 16.5 s, or 17 s, or 17.5 s, or 18 s, or 18.5 s, or 19 s, or 19.5 s, or 20 s, or 20.5 s, or 21 s, or 21.5 s, or 22 s, or 22.5 s, or 23 s, or 23.5 s, or 24 s, or 24.5 s, or 25 s, or 25.5 s, or 26 s, or 26.5 s, or 27 s, or 27.5 s, or 28 s, or 28.5 s, or 29 s, or 29.5 s, or 30 s, or 30.5 s, or 31 s, or 31.5 s, or 32 s, or 32.5 s, or 33 s, or 33.5 s, or 34 s, or 34.5 s, or 35 s, or 35.5 s, or 36 s, or 36.5 s, or 37 s, or 37.5 s, or 38 s, or 38.5 s, or 39 s, or 39.5 s, or 40 s, or 40.5 s, or 41 s, or 41.5 s, or 42 s, or 42.5 s, or 43 s, or 43.5 s, or 44 s, or 44.5 s, or 45 s, or 45.5 s, or 46 s, or 46.5 s, or 47 s, or 47.5 s, or 48 s, or 48.5 s, or 49 s, or 49.5 s, or 50 s, or 50.5 s, or 51 s, or 51.5 s, or 52 s, or 52.5 s, or 53 s, or 53.5 s, or 54 s, or 54.5 s, or 55 s, or 55.5 s, or 56 s, or 56.5 s, or 57 s, or 57.5 s, or 58 s, or 58.5 s, or 59 s, or 59.5 s, or 60 s, or 60.5 s, or 61 s, or 61.5 s, or 62 s, or 62.5 s, or 63 s, or 63.5 s, or 64 s, or 64.5 s, or 65 s, or 65.5 s, or 66 s, or 66.5 s, or 67 s, or 67.5 s, or 68 s, or 68.5 s, or 69 s, or 69.5 s, or 70 s, or 70.5 s, or 71 s, or 71.5 s, or 72 s, or 72.5 s, or 73 s, or 73.5 s, or 74 s, or 74.5 s, or 75 s, or 75.5 s, or 76 s, or 76.5 s, or 77 s, or 77.5 s, or 78 s, or 78.5 s, or 79 s, or 79.5 s, or 80 s, or 80.5 s, or 81 s, or 81.5 s, or 82 s, or 82.5 s, or 83 s, or 83.5 s, or 84 s, or 84.5 s, or 85 s, or 85.5 s, or 86 s, or 86.5 s, or 87 s, or 87.5 s, or 88 s, or 88.5 s, or 89 s, or 89.5 s, or 90 s, or 90.5 s, or 91 s, or 91.5 s, or 92 s, or 92.5 s, or 93 s, or 93.5 s, or 94 s, or 94.5 s, or 95 s, or 95.5 s, or 96 s, or 96.5 s, or 97 s, or 97.5 s, or 98 s, or 98.5 s, or 99 s, or 99.5 s, or 100 s, or 0.5 min, or 1 min, or 1.5 min, or 2 min, or 2.5 min, or 3 min, or 3.5 min, or 4 min, or 4.5 min, or 5 min, or 5.5 min, or 6 min, or 6.5 min, or 7 min, or 7.5 min, or 8 min, or 8.5 min, or 9 min, or 9.5 min, or 10 min, or 10.5 min, or 11 min, or 11.5 min, or 12 min, or 12.5 min, or 13 min, or 13.5 min, or 14 min, or 14.5 min, or 15 min, or 15.5 min, or 16 min, or 16.5 min, or 17 min, or 17.5 min, or 18 min, or 18.5 min, or 19 min, or 19.5 min, or 20 min, or 20.5 min, or 21 min, or 21.5 min, or 22 min, or 22.5 min, or 23 min, or 23.5 min, or 24 min, or 24.5 min, or 25 min, or 25.5 min, or 26 min, or 26.5 min, or 27 min, or 27.5 min, or 28 min, or 28.5 min, or 29 min, or 29.5 min, or 30 min, or 30.5 min, or 31 min, or 31.5 min, or 32 min, or 32.5 min, or 33 min, or 33.5 min, or 34 min, or 34.5 min, or 35 min, or 35.5 min, or 36 min, or 36.5 min, or 37 min, or 37.5 min, or 38 min, or 38.5 min, or 39 min, or 39.5 min, or 40 min, or 40.5 min, or 41 min, or 41.5 min, or 42 min, or 42.5 min, or 43 min, or 43.5 min, or 44 min, or 44.5 min, or 45 min, or 45.5 min, or 46 min, or 46.5 min, or 47 min, or 47.5 min, or 48 min, or 48.5 min, or 49 min, or 49.5 min, or 50 min, or 50.5 min, or 51 min, or 51.5 min, or 52 min, or 52.5 min, or 53 min, or 53.5 min, or 54 min, or 54.5 min, or 55 min, or 55.5 min, or 56 min, or 56.5 min, or 57 min, or 57.5 min, or 58 min, or 58.5 min, or 59 min, or 59.5 min, or 60 min, or 60.5 min, or 61 min, or 61.5 min, or 62 min, or 62.5 min, or 63 min, or 63.5 min, or 64 min, or 64.5 min, or 65 min, or 65.5 min, or 66 min, or 66.5 min, or 67 min, or 67.5 min, or 68 min, or 68.5 min, or 69 min, or 69.5 min, or 70 min, or 70.5 min, or 71 min, or 71.5 min, or 72 min, or 72.5 min, or 73 min, or 73.5 min, or 74 min, or 74.5 min, or 75 min, or 75.5 min, or 76 min, or 76.5 min, or 77 min, or 77.5 min, or 78 min, or 78.5 min, or 79 min, or 79.5 min, or 80 min, or 80.5 min, or 81 min, or 81.5 min, or 82 min, or 82.5 min, or 83 min, or 83.5 min, or 84 min, or 84.5 min, or 85 min, or 85.5 min, or 86 min, or 86.5 min, or 87 min, or 87.5 min, or 88 min, or 88.5 min, or 89 min, or 89.5 min, or 90 min, or 90.5 min, or 91 min, or 91.5 min, or 92 min, or 92.5 min, or 93 min, or 93.5 min, or 94 min, or 94.5 min, or 95 min, or 95.5 min, or 96 min, or 96.5 min, or 97 min, or 97.5 min, or 98 min, or 98.5 min, or 99 min, or 99.5 min, or 100 min, or 0.5 h, or 1 h, or 1.5 h, or 2 h, or 2.5 h, or 3 h, or 3.5 h, or 4 h, or 4.5 h, or 5 h, or 5.5 h, or 6 h, or 6.5 h, or 7 h, or 7.5 h, or 8 h, or 8.5 h, or 9 h, or 9.5 h, or 10 h, or 10.5 h, or 11 h, or 11.5 h, or 12 h, or 12.5 h, or 13 h, or 13.5 h, or 14 h, or 14.5 h, or 15 h, or 15.5 h, or 16 h, or 16.5 h, or 17 h, or 17.5 h, or 18 h, or 18.5 h, or 19 h, or 19.5 h, or 20 h, or 20.5 h, or 21 h, or 21.5 h, or 22 h, or 22.5 h, or 23 h, or 23.5 h, or 24 h, or 24.5 h, or 25 h, or 25.5 h, or 26 h, or 26.5 h, or 27 h, or 27.5 h, or 28 h, or 28.5 h, or 29 h, or 29.5 h, or 30 h, or 30.5 h, or 31 h, or 31.5 h, or 32 h, or 32.5 h, or 33 h, or 33.5 h, or 34 h, or 34.5 h, or 35 h, or 35.5 h, or 36 h, or 36.5 h, or 37 h, or 37.5 h, or 38 h, or 38.5 h, or 39 h, or 39.5 h, or 40 h, or 40.5 h, or 41 h, or 41.5 h, or 42 h, or 42.5 h, or 43 h, or 43.5 h, or 44 h, or 44.5 h, or 45 h, or 45.5 h, or 46 h, or 46.5 h, or 47 h, or 47.5 h, or 48 h, or 48.5 h, or 49 h, or 49.5 h, or 50 h, or 50.5 h, or 51 h, or 51.5 h, or 52 h, or 52.5 h, or 53 h, or 53.5 h, or 54 h, or 54.5 h, or 55 h, or 55.5 h, or 56 h, or 56.5 h, or 57 h, or 57.5 h, or 58 h, or 58.5 h, or 59 h, or 59.5 h, or 60 h, or 60.5 h, or 61 h, or 61.5 h, or 62 h, or 62.5 h, or 63 h, or 63.5 h, or 64 h, or 64.5 h, or 65 h, or 65.5 h, or 66 h, or 66.5 h, or 67 h, or 67.5 h, or 68 h, or 68.5 h, or 69 h, or 69.5 h, or 70 h, or 70.5 h, or 71 h, or 71.5 h, or 72 h, or 72.5 h, or 73 h, or 73.5 h, or 74 h, or 74.5 h, or 75 h, or 75.5 h, or 76 h, or 76.5 h, or 77 h, or 77.5 h, or 78 h, or 78.5 h, or 79 h, or 79.5 h, or 80 h, or 80.5 h, or 81 h, or 81.5 h, or 82 h, or 82.5 h, or 83 h, or 83.5 h, or 84 h, or 84.5 h, or 85 h, or 85.5 h, or 86 h, or 86.5 h, or 87 h, or 87.5 h, or 88 h, or 88.5 h, or 89 h, or 89.5 h, or 90 h, or 90.5 h, or 91 h, or 91.5 h, or 92 h, or 92.5 h, or 93 h, or 93.5 h, or 94 h, or 94.5 h, or 95 h, or 95.5 h, or 96 h, or 96.5 h, or 97 h, or 97.5 h, or 98 h, or 98.5 h, or 99 h, or 99.5 h, or 100 h, or 1 week, or 1 month, or 1 quarter, or 6 months, or 1 year.

EXAMPLE EMBODIMENTS

Independent Example Embodiment 1

A process for subsea power generation and fluid utilization from open water currents, comprising:

- channeling water from a subsea current through a pipe system adapted for subsea deployment, said pipe system constructed to withstand subsea pressures and resist corrosion and biofouling;
- cyclically closing a valve within the pipe system to create a pressure surge via the water hammer effect;
- directing the pressurized fluid through a delivery valve operatively connected to the pipe system to an output system configured for at least one of:
- power generation,
- fluid transport,
- desalination,
- pressure exchange,
- fluid pressurization,
- energy storage, or
- downstream processing.

Dependent Example embodiment 2: The process of example embodiment 1, wherein the output system is configured to:

- transport the pressurized fluid to a higher elevation reservoir, surface platform, or land-based facility; or
- integrate with infrastructure selected from the group consisting of offshore wind turbine towers, oil rigs, floating production storage and offloading vessels, or coastal facilities for energy or fluid applications.

Independent Example Embodiment 1

A process for subsea power generation from open water currents comprising:

- allowing water from a subsea current to flow through a subsea pipe;
- closing a valve in the subsea pipe creating a pressure surge due to the water hammer effect;
- directing the amplified pressure through a delivery valve fluidly connected to the subsea
- pipe transferring at least a portion of the amplified pressure fluid to an output system

Dependent Example Embodiment 1

- an output system operatively connected to the pump chamber, wherein the output system is configured to:
- transporting the pressurized fluid to a higher elevation reservoir, a surface platform, or a land-based facility; or
- utilizing the pressurized fluid for at least one of: energy generation, or fluid transfer, or fluid pressurization, or pressure exchanger, desalination, or energy storage, or downstream processing;

Independent Example Embodiment 1

A process for subsea power generation from open water currents comprising:

- allowing water from a subsea current to flow through a subsea pipe;
- closing a valve in the subsea pipe creating a pressure surge due to the water hammer effect;
- directing the amplified pressure through a delivery valve fluidly connected to the subsea pipe transferring at least a portion of the amplified pressure fluid to an output system

Dependent Example Embodiment 1 an output system operatively connected to the pump chamber, wherein the output system is configured to:

- transporting the pressurized fluid to a higher elevation reservoir, a surface platform, or a land-based facility; or
- utilizing the pressurized fluid for at least one of: energy generation, or fluid transfer, or fluid pressurization, or pressure exchanger, desalination, or energy storage, or downstream processing;

The process of example embodiment 1, wherein the pipe system includes a flow concentrator at the intake, configured to increase the velocity and kinetic energy of the incoming water.

The process of example embodiment 1, wherein the valve within the pipe system is a self-actuating waste valve constructed from materials resistant to corrosion, biofouling, and pressure-induced deformation.

The process of example embodiment 1, wherein the delivery valve is configured to regulate the flow of pressurized fluid to ensure consistent output pressure for downstream applications.

The process of example embodiment 1, wherein the pipe system includes internal flow-stabilizing vanes or baffles to reduce turbulence and enhance the efficiency of pressure amplification.

The process of example embodiment 1, wherein the system incorporates a flow diffuser at the discharge end of the output system to control the expansion of the pressurized fluid and minimize environmental impact.

The process of example embodiment 1, wherein the pipe system and pump chamber are constructed from marine-grade stainless steel, titanium, or advanced composites to withstand the corrosive subsea environment.

The process of example embodiment 1, wherein the system includes anti-fouling coatings or biofouling-resistant materials applied to internal and external surfaces of the pipe system and pump chamber.

The process of example embodiment 1, wherein the system includes integrated self-cleaning mechanisms, comprising high-velocity water jets and sediment flushing channels, to prevent clogging and maintain operational efficiency.

The process of example embodiment 1, wherein the system includes sensors to monitor pressure, flow rate, and valve performance, with data transmitted to a surface platform or control station for real-time diagnostics.

The process of example embodiment 1, wherein the pipe system and pump chamber are constructed from marine-grade stainless steel, titanium, or advanced composites to withstand the corrosive subsea environment.

The process of example embodiment 1, wherein the system includes anti-fouling coatings or biofouling-resistant materials applied to internal and external surfaces of the pipe system and pump chamber.

The process of example embodiment 1, wherein the system includes integrated self-cleaning mechanisms, comprising high-velocity water jets and sediment flushing channels, to prevent clogging and maintain operational efficiency.

The process of example embodiment 1, wherein the system includes sensors to monitor pressure, flow rate, and valve performance, with data transmitted to a surface platform or control station for real-time diagnostics.

The process of example embodiment 1, wherein the output system is configured to drive a hydroelectric turbine for generating electricity from the pressurized fluid.

The process of example embodiment 1, wherein the output system includes a pressure exchanger configured to transfer hydraulic energy to a secondary fluid for applications such as desalination or fluid pressurization.

The process of example embodiment 1, wherein the pressurized fluid is used to transport water or other fluids through subsea pipelines for long-distance fluid transfer.

The process of example embodiment 1, wherein the pressurized fluid is stored in a subsea hydraulic pressure storage device, said device comprising pressure vessels configured to hold pressurized fluid for energy buffering or peak demand applications.

The process of example embodiment 1, wherein the pressurized fluid is transferred to a higher elevation reservoir located on an offshore platform, wind turbine tower, or floating vessel, or bridge for energy storage and power generation.

The process of example embodiment 1, wherein the reservoir discharges water through a hydroelectric turbine located at a lower elevation, converting potential energy into electricity.

The process of example embodiment 1, wherein the reservoir integrates with existing infrastructure, selected from the group consisting of oil rigs, FPSOs, coastal facilities, or island-based reservoirs.

The process of example embodiment 1, wherein the system is integrated with a hybrid energy system, including renewable energy sources selected from the group consisting of tidal turbines, offshore wind turbines, wave energy converters, or solar panels.

The process of example embodiment 1, wherein multiple units are deployed in parallel and connected to a single output system to aggregate pressurized fluid streams for increased capacity and efficiency.

The process of example embodiment 1, wherein the system is configured for modular deployment, allowing individual components, including the pump chamber, pipe system, and output system, to be replaced or scaled independently to meet specific operational requirements.

The process of example embodiment 1, wherein the pipe system and pump chamber are configured to operate in ultra-deepwater conditions, exceeding depths of 500 meters, with structural reinforcements to withstand high ambient pressures.

The process of example embodiment 1, wherein the system incorporates integrated thermal management components to regulate temperature fluctuations caused by subsea environmental conditions or operational processes.

The process of example embodiment 1, wherein the system includes a structural anchoring mechanism selected from the group consisting of suction anchors, gravity-based foundations, pile-driven supports, or hydrodynamically shaped bases to ensure stability in high-flow or turbulent subsea environments.

The process of example embodiment 1, wherein the pressurized fluid drives a turbocharger pressure exchanger to boost the pressure of a secondary fluid for energy recovery or fluid transport applications.

The process of example embodiment 1, wherein the pressurized fluid is used to power subsea hydraulic actuators or machinery, providing localized mechanical energy for subsea operations such as drilling, pipeline maintenance, or deep-sea mining.

The process of example embodiment 1, wherein the system includes an integrated energy recovery mechanism to capture residual pressure energy from discharged fluid for supplemental power generation or storage.

The process of example embodiment 1, wherein the system includes environmental impact mitigation features, such as controlled water discharge rates and diffused flow outlets, to minimize erosion, marine habitat disruption, or sediment displacement at the discharge site.

The process of example embodiment 1, wherein the monitoring and control subsystem includes artificial intelligence algorithms configured to optimize system operation by analyzing real-time data and predicting maintenance requirements.

The process of example embodiment 1, wherein the hydraulic ram pump system is deployed in inland water currents, including rivers, estuaries, or canals, for energy generation, water transfer, or industrial fluid processing.

The process of example embodiment 1, wherein the system is integrated with a floating or semi-submersible platform, allowing deployment in locations with variable water depths or surface conditions, such as tidal basins or offshore wind farms.

A Subsea Hydraulic Energy System for Generating Pressurized Fluid from Open Water Currents and Enabling Downstream Applications, Comprising:

- a pump chamber adapted for operation in subsea environments, configured to amplify the pressure of fluid entering the chamber by creating a water hammer effect;
- a self-actuating waste valve within the pump chamber, configured to cyclically release fluid to generate the water hammer effect, wherein the waste valve is designed to withstand high ambient pressures and subsea conditions;
- a delivery valve operatively connected to the pump chamber, configured to direct the pressurized fluid to an output system;
- an output system operatively connected to the delivery valve, said output system configured to:
- transport the pressurized fluid to a higher elevation reservoir, surface platform, or land-based facility; or
- directly utilize the pressurized fluid for at least one of: power generation, fluid transport, fluid pressurization, pressure exchange, desalination, or energy storage;
- wherein the system is modular, scalable, and configured for integration with existing subsea infrastructure or offshore facilities, including offshore wind turbines, oil rigs, or floating production systems, and further includes features for real-time monitoring and predictive maintenance to ensure reliable operation under subsea conditions.

A system for subsea fluid pressurization and utilization, comprising:

- a subsea pump chamber configured to amplify fluid pressure using a water hammer effect generated by cyclic fluid flow interruption;

a waste valve operatively connected to the pump chamber, configured to release fluid cyclically to create the water hammer effect under subsea ambient pressure conditions;

a delivery valve operatively connected to the pump chamber, configured to direct pressurized fluid to an output conduit;

an output conduit configured to transport the pressurized fluid to at least one destination selected from the group consisting of:

a higher elevation reservoir, a surface platform, a land-based facility, or a subsea pipeline;

wherein the system is designed for integration with infrastructure selected from the group consisting of offshore energy platforms, floating vessels, subsea power generation systems, or hybrid renewable energy installations; and wherein the pressurized fluid is used for at least one of: energy generation, fluid transfer, hydraulic power for subsea operations, desalination, pressure exchange, or energy storage.

A subsea system for amplifying fluid pressure and enabling downstream utilization, comprising:

a pump assembly configured to operate in a subsea environment, the pump assembly including:

a pump chamber designed to amplify pressure in a fluid using a water hammer effect, a self-actuating waste valve configured to cyclically release fluid from the pump chamber to create the water hammer effect under subsea ambient pressure conditions, and a delivery valve configured to direct pressurized fluid from the pump chamber to an output system;

an output system fluidly connected to the pump assembly, the output system configured to:

transfer the pressurized fluid to one or more destinations selected from the group consisting of:

a higher elevation reservoir, a surface-based energy or storage system, or a land-based facility;

directly utilize the pressurized fluid for at least one of:

power generation, hydraulic actuation, subsea fluid transport, desalination, or energy recovery;

wherein the system is configured with subsea-specific adaptations, including:

corrosion-resistant materials, anti-fouling coatings, and structural reinforcement to withstand high ambient pressures and subsea conditions;

and wherein the system is modular, enabling scalability through the addition or removal of pump assemblies or output components to meet specific operational requirements.

A system for amplifying and utilizing fluid pressure in subsea environments, comprising:

a pump chamber configured to receive fluid from an open water source and amplify its pressure through a water hammer effect generated by cyclic flow interruption;

a waste valve operatively connected to the pump chamber, configured to self-actuate in response to fluid dynamics and generate the water hammer effect under high-pressure subsea conditions;

a delivery valve operatively connected to the pump chamber, configured to direct the amplified pressure fluid into an output conduit;

an output conduit configured to:

transport the pressurized fluid to at least one destination selected from the group consisting of: a subsea turbine, a higher elevation reservoir, a pressure exchanger, or a surface or land-based energy system; or supply the pressurized fluid for at least one application selected from the group consisting of: energy generation, subsea fluid transport, desalination, or energy recovery;

wherein the system is integrated with a flow concentrator positioned upstream of the pump chamber, configured to increase the velocity of incoming fluid and enhance the efficiency of pressure amplification;

and wherein the system is configured for deployment with subsea infrastructure selected from the group consisting of: offshore wind turbine foundations, floating vessels, subsea power grids, or modular subsea energy hubs.

A subsea hydraulic system for amplifying fluid pressure and enabling downstream applications, comprising:

a pump assembly configured to operate in a subsea environment, the pump assembly including:

a pump chamber adapted to amplify fluid pressure through a water hammer effect created by cyclic fluid flow interruption;

a waste valve configured to self-actuate in response to fluid dynamics to generate the water hammer effect under high ambient subsea pressures; and a delivery valve configured to release pressurized fluid from the pump chamber into an output conduit;

an output conduit operatively connected to the pump assembly and configured to: transport the pressurized fluid to a destination selected from the group consisting of:

a subsea hydraulic power unit, a higher elevation reservoir, a floating platform, or a land-based facility; or supply the pressurized fluid for at least one of the following applications:

energy generation using a hydroelectric turbine, reverse osmosis desalination, subsea fluid transport, pressure exchange with a secondary fluid, or energy recovery;

wherein the system includes monitoring and control mechanisms configured to optimize operation by tracking parameters including pressure, flow rate, and valve performance;

and wherein the system is scalable, enabling deployment in modular configurations to accommodate varying flow conditions, fluid volumes, and operational demands.

A method for generating pressurized fluid and enabling downstream applications in a subsea environment, comprising:

channeling fluid from a subsea current into a pump chamber adapted to operate under subsea pressure conditions;

cyclically actuating a waste valve within the pump chamber to intermittently release the fluid, thereby creating a water hammer effect to amplify fluid pressure;

directing the amplified pressure fluid through a delivery valve into an output conduit operatively connected to the pump chamber;

transporting the pressurized fluid through the output conduit to at least one destination selected from the group consisting of:

a subsea turbine, a higher elevation reservoir, a surface platform, a pressure exchanger, or a land-based facility;

utilizing the pressurized fluid at the destination for at least one application selected from the group consisting of:

energy generation, subsea fluid transport, reverse osmosis desalination, energy storage, or hydraulic power for subsea operations;

monitoring operational parameters of the method, including at least one of pressure, flow rate, or valve actuation cycles, to optimize system performance and predict maintenance requirements.

A method for amplifying and utilizing fluid pressure in a subsea environment, comprising:

capturing fluid from a subsea current using an intake system configured to channel fluid into a pump chamber;

amplifying the pressure of the captured fluid within the pump chamber by cyclically actuating a waste valve to create a water hammer effect under ambient subsea pressure conditions;

releasing the amplified pressure fluid through a delivery valve operatively connected to the pump chamber;

transporting the pressurized fluid via an output conduit to at least one destination selected from the group consisting of:

a subsea turbine for energy generation, a higher elevation reservoir for energy storage, a surface or land-based facility for downstream processing, or a subsea pressure exchanger for hydraulic energy transfer;

utilizing the pressurized fluid for at least one application selected from the group consisting of:

power generation, subsea fluid transport, reverse osmosis desalination, pressure amplification for industrial processes, or energy recovery;

monitoring and controlling the operation of the pump chamber and output conduit by:

tracking operational parameters including fluid pressure, flow rate, and valve performance, and adjusting system components to optimize performance and extend service life.

1. A process for subsea power generation and fluid utilization from open water currents, comprising:

channeling water from a subsea current through a pipe system adapted for subsea deployment, said pipe system constructed to withstand subsea pressures;

cyclically closing a valve within the pipe system to create a pressure surge via the water hammer effect;

directing the pressurized fluid through a delivery valve operatively connected to the pipe system to an output system configured for at least one of: power generation, fluid transport, desalination, pressure exchange, fluid pressurization, energy storage, or downstream processing.

2. The process of example embodiment 1 wherein the output system is configured to:

transport the pressurized fluid to a higher elevation reservoir, surface platform, or land-based facility; or integrate with infrastructure selected from the group consisting of offshore wind turbine towers, offshore platforms, bridges, oil rigs, subsea processing or fluid handling, floating production storage and offloading vessels, or coastal facilities for energy or fluid applications.

3. The process of example embodiment 1 wherein the pipe system includes a flow concentrator at the intake.

4. The process of example embodiment 1 wherein the system incorporates a flow diffuser at the discharge end of the output system.

5. The process of example embodiment 1 wherein the output system is configured to drive a hydroelectric turbine for generating electricity from the pressurized fluid.

6. The process of example embodiment 1 wherein the output system includes a pressure exchanger configured to transfer hydraulic power to a secondary fluid for downstream applications.

7. The process of example embodiment 1 wherein the pressurized fluid is used to transport water or other fluids through subsea pipelines.

8. The process of example embodiment 1 wherein the pressurized fluid is stored in a subsea hydraulic pressure storage device, 9. The process of example embodiment 8 wherein said device comprising pressure vessels configured to hold pressurized fluid.

10. The process of example embodiment 8 wherein said device comprises a subsea fluid displacement energy storage device.

11. The process of example embodiment 1 wherein the pressurized fluid is transferred to a higher elevation reservoir located on an offshore platform, wind turbine tower, or floating vessel, or bridge, or oil rigs, or FPSOs, or coastal facilities, onshore structure, or offshore structure, or any combination thereof for energy storage and power generation.

12. The process of example embodiment 11 wherein the reservoir discharges water through a hydroelectric turbine located at a lower elevation to convert potential energy into power.

13. The process of example embodiment 1 wherein the system includes sensors to monitor pressure, flow rate, and valve performance with data transmitted to a surface platform or control station.

14. The process of example embodiment 1 wherein multiple units are deployed in parallel and connected to a single output system to aggregate pressurized fluid streams for increased capacity and efficiency.

15. The process of example embodiment 1 wherein the pipe system and pump chamber are configured to operate in deepwater conditions exceeding depths of 50 meters.

16. The process of example embodiment 1, wherein the system includes a structural anchoring mechanism selected from the group consisting of suction anchors, gravity-based foundations, pile-driven supports, or hydrodynamically shaped bases.

17. The process of example embodiment 1, wherein the pressurized fluid drives a turbocharger pressure exchanger to transfer pressure or power to a secondary fluid.

18. The process of example embodiment 1, wherein the pressurized fluid is used to power subsea hydraulic actuators or machinery.

19. The process of example embodiment 1 wherein the process is deployed in locations with variable water depths or surface conditions including tidal basins or offshore wind farms.

20. The process of example embodiment 1 wherein the process is deployed in water currents.

21. The process of example embodiment 1 wherein the system includes anti-fouling coatings or biofouling-resistant materials applied to internal surfaces of the drive pipe and pump chamber.

22. The process of example embodiment 1 wherein the system includes integrated self-cleaning mechanisms, comprising sediment flushing channels.

23. A subsea hydraulic energy system for generating pressurized fluid from open water currents and enabling downstream applications, comprising:

a pump chamber adapted for operation in subsea environments, configured to amplify the pressure of fluid entering the chamber by creating a water hammer effect;

a self-actuating waste valve within the pump chamber, configured to cyclically release fluid to generate the water hammer effect, wherein the waste valve is designed to withstand high ambient pressures and subsea conditions;

a delivery valve operatively connected to the pump chamber, configured to direct the pressurized fluid to an output system;

an output system operatively connected to the delivery valve, said output system configured to:

transport the pressurized fluid to a higher elevation reservoir, surface platform, or land-based facility; or utilize the pressurized fluid for at least one of: power generation, fluid transport, fluid pressurization, pressure exchange, desalination, or energy storage.

24. A system for subsea power generation, comprising:

a subsea pump chamber configured to transform flow velocity to fluid pressure using a water hammer effect generated by cyclic fluid flow interruption;

a waste valve operatively connected to the pump chamber, configured to release fluid cyclically to create the water hammer effect under subsea ambient pressure conditions;

a delivery valve operatively connected to the pump chamber, configured to direct pressurized fluid to an output conduit;

an output conduit configured to transport the pressurized fluid to at least one destination selected from the group consisting of: a higher elevation reservoir, or a surface platform, or a land-based facility, or a subsea pipeline;

wherein the system is designed for integration with infrastructure selected from the group consisting of offshore energy platforms, floating vessels, subsea power generation systems, or hybrid renewable energy installations; and wherein the pressurized fluid is used for at least one of: energy generation, fluid transfer, hydraulic power for subsea operations, desalination, pressure exchange, or energy storage.

25. A system for subsea power generation, comprising:

a pump chamber configured to receive a moving fluid from an open water source and amplify its pressure through a water hammer effect generated by cyclic flow interruption;

a waste valve operatively connected to the pump chamber, configured to self-actuate in response to fluid dynamics and generate the water hammer effect under high-pressure subsea conditions;

a delivery valve operatively connected to the pump chamber, configured to direct the amplified pressure fluid into an output conduit;

an output conduit configured to:

transport the pressurized fluid to at least one destination selected from the group consisting of: a subsea turbine, a higher elevation reservoir, a pressure exchanger, or a surface or land-based energy system; or supply the pressurized fluid for at least one application selected from the group consisting of: energy generation, subsea fluid transport, desalination, or energy recovery;

wherein the system is integrated with a flow concentrator positioned upstream of the pump chamber, configured to increase the velocity of incoming fluid and enhance the efficiency of pressure amplification; and wherein the system is configured for deployment with subsea infrastructure selected from the group consisting of: offshore wind turbine foundations, floating vessels, subsea power grids, or modular subsea energy hubs.

26. A method for transforming fluid velocity into power in a subsea environment, comprising:

capturing fluid from a subsea current using an intake system configured to channel fluid into a pump chamber;

amplifying the velocity pressure of the captured fluid within the pump chamber by cyclically actuating a waste valve to create a water hammer effect;

releasing the amplified pressure fluid through a delivery valve operatively connected to the pump chamber;

transporting the pressurized fluid via an output conduit to at least one downstream application selected from the group consisting of: a subsea turbine for energy generation, or a higher elevation reservoir for energy storage, or a surface or land-based facility for storage or downstream processing, or a subsea pressure exchanger for hydraulic energy transfer;

utilizing the pressurized fluid for at least one application selected from the group consisting of: power generation, or subsea fluid transport, or reverse osmosis desalination, or pressure amplification for industrial processes, or energy recovery.

The invention claimed is:

1. A process for subsea power generation and fluid utilization from open water currents, comprising:

channeling water from a subsea current through a pipe system constructed to withstand subsea pressures;

creating a water hammered pressurized fluid within the pipe system;

directing the water hammered pressurized fluid through a delivery valve; and using the water hammered pressurized fluid; wherein the using comprises one or more of: power generation, fluid transport, desalination, pressure exchange, fluid pressurization, energy storage, and downstream processing.

2. The process of claim 1 wherein the pressure exchange comprises transferring pressure from the water hammered pressurized fluid to a secondary fluid without mixing the water hammered pressurized fluid and the secondary fluid.

3. The process of claim 1 wherein the water hammered pressurized fluid is created by cyclically closing a valve within the pipe system.

4. The process of claim 3 which further comprises monitoring pressure, flow rate, and valve performance and transmitting data to a surface platform or control station.

5. The process of claim 1 which further comprises:

transporting the pressurized fluid to a higher elevation reservoir, a surface platform, or a land-based facility; or integrating the pressurized fluid with an infrastructure selected from the group consisting of offshore wind turbine towers, offshore platforms, bridges, oil rigs, subsea processing or fluid handling facilities, floating production storage and offloading vessels, coastal facilities for energy or fluid applications, or any combination thereof.

6. The process of claim 1 which further comprises concentrating the subsea current at an intake of the pipe system.

7. The process of claim 1 which further comprises diffusing flow.

8. The process of claim 1 wherein the using comprises driving a hydroelectric turbine for generating electricity.

9. The process of claim 1 wherein the using comprises pressure exchanging to transfer hydraulic power to a secondary fluid for downstream applications.

10. The process of claim 1 wherein the using comprises fluid transport through subsea pipelines.

11. The process of claim 1 which further comprises storing the pressurized fluid in a subsea hydraulic pressure storage device.

12. The process of claim 11 wherein said device comprises pressure vessels configured to hold pressurized fluid.

13. The process of claim 11 wherein said device comprises a subsea fluid displacement energy storage device.

14. The process of claim 1 wherein the using comprises transferring pressurized fluid to a higher elevation reservoir located on an offshore platform, wind turbine tower, or floating vessel, or bridge, or oil rigs, or FPSOs, or coastal facilities, onshore structure, or offshore structure, or any combination thereof.

15. The process of claim 14 which further comprises discharging the transferred pressurized fluid to a hydroelectric turbine located at a lower elevation to convert potential energy into power.

16. The process of claim 1 which further comprises deploying a second pipe system in parallel to aggregate pressurized fluid.

17. The process of claim 1 which comprises channeling water from a subsea current of below 50 meters.

18. The process of claim 1 which further comprises anchoring at least a portion of the pipe system with a structural anchoring mechanism selected from the group consisting of suction anchors, gravity-based foundations, pile-driven supports, or hydrodynamically shaped bases.

19. The process of claim 1 wherein the using comprises driving a turbocharger pressure exchanger to transfer pressure or power to a secondary fluid.

20. The process of claim 1 wherein the using comprises powering subsea hydraulic actuators, machinery, or both.

21. The process of claim 1 which further comprises employing anti-fouling coatings, biofouling-resistant materials, or both.

22. The process of claim 1 which further comprises employing one or more sediment flushing channels.

23. A method for transforming fluid velocity into power in a subsea environment, comprising:

capturing fluid from a subsea current using an intake system configured to channel fluid into a pump chamber;

amplifying the velocity pressure of the captured fluid within the pump chamber by cyclically actuating a valve to create a water hammer effect;

releasing the amplified pressure fluid through a delivery valve operatively connected to the pump chamber;

transporting the released amplified pressurized fluid via an output conduit to at least one downstream application selected from the group consisting of: a subsea turbine for energy generation, or a higher elevation reservoir for energy storage, or a surface or land-based facility for storage or downstream processing, or a subsea pressure exchanger for hydraulic energy transfer; and utilizing the transported released amplified pressurized fluid for at least one application selected from the group consisting of: power generation, or subsea fluid transport, or reverse osmosis desalination, or pressure amplification for industrial processes, or energy recovery.

24. The process of claim 23 which comprises transferring energy from the subsea pressure exchanger to a secondary fluid without mixing the amplified pressurized fluid and the secondary fluid and wherein the energy transfer efficiency exceeds 90%.

* * * * *